US012183354B2

(12) United States Patent
Riedmiller et al.

(10) Patent No.: US 12,183,354 B2
(45) Date of Patent: *Dec. 31, 2024

(54) AUDIO ENCODER AND DECODER WITH DYNAMIC RANGE COMPRESSION METADATA

(71) Applicant: Dolby Laboratories Licensing Corporation, San Francisco, CA (US)

(72) Inventors: Jeffrey Riedmiller, Novato, CA (US); Michael Ward, Orinda, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/511,495

(22) Filed: Nov. 16, 2023

(65) Prior Publication Data

US 2024/0153515 A1 May 9, 2024

Related U.S. Application Data

(63) Continuation of application No. 17/878,410, filed on Aug. 1, 2022, now Pat. No. 11,823,693, which is a (Continued)

(51) Int. Cl.
*G10L 19/00* (2013.01)
*G10L 19/008* (2013.01)
(Continued)

(52) U.S. Cl.
CPC .......... *G10L 19/167* (2013.01); *G10L 19/008* (2013.01); *G10L 19/018* (2013.01); *G10L 19/22* (2013.01)

(58) Field of Classification Search
CPC ... G10L 19/167; G10L 19/008; G10L 19/018; G10L 19/22; G10L 19/26; G10L 21/0316;
(Continued)

(56) References Cited

U.S. PATENT DOCUMENTS

| | | |
|---|---|---|
| 5,297,236 A | 3/1994 | Antill et al. |
| 6,530,021 B1 | 3/2003 | Epstein |

(Continued)

FOREIGN PATENT DOCUMENTS

| | | |
|---|---|---|
| CN | 1973434 A | 5/2007 |
| CN | 101156206 A | 4/2008 |

(Continued)

OTHER PUBLICATIONS

"A Guide to Dolby Metadata" Jan. 1, 2005, pp. 1-28 (available at http://www.dolby.com/us/en/technologies/a-guide-to-dolby-metadata.pdf).

(Continued)

*Primary Examiner* — Abdelali Serrou

(57) ABSTRACT

An audio processing unit (APU) is disclosed. The APU includes a buffer memory configured to store at least one frame of an encoded audio bitstream, where the encoded audio bitstream includes audio data and a metadata container. The metadata container includes a header and one or more metadata payloads after the header. The one or more metadata payloads include dynamic range compression (DRC) metadata, and the DRC metadata is or includes profile metadata indicative of whether the DRC metadata includes dynamic range compression (DRC) control values for use in performing dynamic range compression in accordance with at least one compression profile on audio content indicated by at least one block of the audio data.

4 Claims, 4 Drawing Sheets

Related U.S. Application Data continuation of application No. 16/820,160, filed on Mar. 16, 2020, now Pat. No. 11,404,071, which is a continuation of application No. 15/694,568, filed on Sep. 1, 2017, now abandoned, which is a continuation of application No. 15/187,310, filed on Jun. 20, 2016, now Pat. No. 10,147,436, which is a continuation of application No. 14/770,375, filed as application No. PCT/US2014/042168 on Jun. 12, 2014, now Pat. No. 10,037,763.

(60) Provisional application No. 61/836,865, filed on Jun. 19, 2013.

(51) Int. Cl.

*G10L 19/018* (2013.01)
*G10L 19/16* (2013.01)
*G10L 19/22* (2013.01)

(58) Field of Classification Search

CPC ......... G10L 19/08; G10L 25/00; G10L 19/16; G10L 17/26; G10L 21/00; G10L 19/00; G10L 19/012; G10L 21/04; G10L 25/06; G10L 25/51; G10L 2021/105; H04S 3/00

See application file for complete search history.

(56) References Cited

U.S. PATENT DOCUMENTS

| | | | | |
|---|---|---|---|---|
| 6,611,607 | B1 | 8/2003 | Davis et al. | |
| 6,909,743 | B1 | 6/2005 | Ward | |
| 6,975,254 | B1 | 12/2005 | Sperschneider et al. | |
| 7,072,477 | B1 | 7/2006 | Kincaid | |
| 7,369,906 | B2 | 5/2008 | Frindle | |
| 7,398,207 | B2 | 7/2008 | Riedl | |
| 7,617,109 | B2 * | 11/2009 | Smithers | G10L 25/00 381/104 |
| 7,729,673 | B2 | 6/2010 | Romesburg | |
| 8,090,120 | B2 | 1/2012 | Seefeldt | |
| 8,091,025 | B2 | 1/2012 | Ramos | |
| 8,195,454 | B2 | 6/2012 | Muesch | |
| 8,204,756 | B2 | 6/2012 | Kim et al. | |
| 8,285,791 | B2 | 10/2012 | Ratcliff | |
| 8,306,406 | B2 | 11/2012 | Morita | |
| 8,315,396 | B2 | 11/2012 | Schreiner | |
| 8,417,531 | B2 | 4/2013 | Kim et al. | |
| 8,615,316 | B2 | 12/2013 | Oh | |
| 8,737,802 | B2 | 5/2014 | Baek | |
| 8,781,820 | B2 | 7/2014 | Seguin | |
| 8,903,098 | B2 | 12/2014 | Tsuji | |
| 8,903,729 | B2 | 12/2014 | Riedmiller | |
| 8,965,774 | B2 | 2/2015 | Eppolito | |
| 8,972,250 | B2 | 3/2015 | Muesch | |
| 8,989,884 | B2 | 3/2015 | Guetta | |
| 9,240,763 | B2 | 1/2016 | Baumgarte | |
| 9,294,062 | B2 | 3/2016 | Hatanaka | |
| 9,300,268 | B2 | 3/2016 | Chen | |
| 9,372,531 | B2 | 6/2016 | Benson | |
| 9,542,952 | B2 | 1/2017 | Hatanaka | |
| 9,576,585 | B2 | 2/2017 | Bleidt | |
| 9,608,588 | B2 | 3/2017 | Baumgarte | |
| 9,633,663 | B2 | 4/2017 | Heuberger | |
| 9,633,667 | B2 | 4/2017 | Fromel | |
| 9,830,915 | B2 | 11/2017 | Schreiner | |
| 9,836,272 | B2 | 12/2017 | Kono | |
| 9,998,081 | B2 | 6/2018 | Rauhala | |
| 2002/0001395 | A1 | 1/2002 | Davis | |
| 2002/0143875 | A1 | 10/2002 | Raymond, III | |
| 2003/0103645 | A1 | 6/2003 | Levy | |
| 2003/0123701 | A1 | 7/2003 | Dorrell | |
| 2003/0125933 | A1 | 7/2003 | Saunders | |
| 2004/0044525 | A1 | 3/2004 | Vinton | |
| 2004/0062267 | A1 | 4/2004 | Minami | |
| 2005/0078840 | A1 | 4/2005 | Riedl | |
| 2005/0172130 | A1 | 8/2005 | Roberts | |
| 2006/0002572 | A1 * | 1/2006 | Smithers | G10L 25/00 381/104 |
| 2006/0018506 | A1 | 1/2006 | Rodriguez | |
| 2007/0016406 | A1 | 1/2007 | Thumpudi | |
| 2007/0040934 | A1 | 2/2007 | Ramaswamy et al. | |
| 2007/0220168 | A1 | 9/2007 | Parsons | |
| 2007/0291959 | A1 * | 12/2007 | Seefeldt | G10L 21/0232 381/104 |
| 2008/0025530 | A1 | 1/2008 | Romesburg | |
| 2008/0044087 | A1 | 2/2008 | Levy | |
| 2008/0288263 | A1 | 11/2008 | Jung et al. | |
| 2009/0063159 | A1 | 3/2009 | Crockett | |
| 2009/0080689 | A1 | 3/2009 | Zhao | |
| 2009/0097676 | A1 | 4/2009 | Seefeldt | |
| 2009/0097821 | A1 | 4/2009 | Yahata | |
| 2009/0210238 | A1 | 8/2009 | Kim | |
| 2009/0254339 | A1 | 10/2009 | Seguin | |
| 2010/0014692 | A1 | 1/2010 | Schreiner | |
| 2010/0027812 | A1 | 2/2010 | Moon | |
| 2010/0027837 | A1 | 2/2010 | Levy | |
| 2010/0076772 | A1 | 3/2010 | Kim | |
| 2010/0083344 | A1 * | 4/2010 | Schildbach | G10L 19/173 704/E21.001 |
| 2010/0121634 | A1 | 5/2010 | Muesch | |
| 2010/0121647 | A1 | 5/2010 | Beack et al. | |
| 2010/0135507 | A1 | 6/2010 | Kino | |
| 2010/0286988 | A1 * | 11/2010 | Carroll | G10L 19/00 704/E21.001 |
| 2011/0002469 | A1 | 1/2011 | Ojala | |
| 2011/0013790 | A1 | 1/2011 | Hilpert et al. | |
| 2011/0196684 | A1 | 8/2011 | Koishida | |
| 2011/0305344 | A1 | 12/2011 | Sole | |
| 2012/0016680 | A1 | 1/2012 | Thesing | |
| 2012/0033816 | A1 | 2/2012 | Lee et al. | |
| 2012/0046956 | A1 | 2/2012 | Stewart | |
| 2012/0057715 | A1 | 3/2012 | Johnston | |
| 2012/0065753 | A1 | 3/2012 | Choo et al. | |
| 2012/0110335 | A1 | 5/2012 | Sandler | |
| 2012/0130721 | A1 | 5/2012 | Sirivara | |
| 2012/0163629 | A1 | 6/2012 | Seefeldt | |
| 2012/0233467 | A1 | 9/2012 | Whillock | |
| 2012/0237039 | A1 | 9/2012 | Thesing | |
| 2012/0243692 | A1 | 9/2012 | Ramamoorthy | |
| 2012/0259643 | A1 | 10/2012 | Engdegard | |
| 2012/0275625 | A1 | 11/2012 | Kono | |
| 2012/0310654 | A1 | 12/2012 | Riedmiller et al. | |
| 2013/0094669 | A1 | 4/2013 | Kono | |
| 2013/0144615 | A1 | 6/2013 | Rauhala | |
| 2013/0144631 | A1 | 6/2013 | Miyasaka | |
| 2013/0246077 | A1 | 9/2013 | Riedmiller | |
| 2014/0068274 | A1 | 3/2014 | Kasatkin | |
| 2014/0074783 | A1 | 3/2014 | Alsina | |
| 2014/0133683 | A1 | 5/2014 | Robinson | |
| 2014/0297291 | A1 | 10/2014 | Baumgarte | |
| 2014/0304515 | A1 | 10/2014 | Feuerman | |
| 2014/0310010 | A1 | 10/2014 | Seo et al. | |
| 2015/0025879 | A1 | 1/2015 | Liu et al. | |
| 2016/0196830 | A1 | 7/2016 | Riedmiller | |
| 2016/0225376 | A1 | 8/2016 | Honma | |
| 2016/0307580 | A1 | 10/2016 | Riedmiller et al. | |
| 2016/0315722 | A1 | 10/2016 | Holman | |
| 2016/0322060 | A1 | 11/2016 | Riedmiller et al. | |
| 2016/0351202 | A1 | 12/2016 | Baumgarte | |
| 2017/0092280 | A1 | 3/2017 | Hirabayashi | |
| 2017/0223429 | A1 | 8/2017 | Schreiner | |

FOREIGN PATENT DOCUMENTS

| | | | |
|---|---|---|---|
| CN | 101156209 | | 4/2008 |
| CN | 101160616 | A | 4/2008 |
| CN | 101189662 | | 5/2008 |
| CN | 101248484 | | 8/2008 |
| CN | 101390335 | | 3/2009 |
| CN | 101513009 | | 8/2009 |
| CN | 101743748 | A | 6/2010 |
| CN | 102171755 | A | 8/2011 |
| CN | 102203854 | | 9/2011 |

(56) References Cited

FOREIGN PATENT DOCUMENTS

| | | | |
|---|---|---|---|
| CN | 102428514 | | 4/2012 |
| CN | 102483925 | | 5/2012 |
| CN | 102610229 | | 7/2012 |
| CN | 102687198 | | 9/2012 |
| CN | 102792588 | A | 11/2012 |
| CN | 104995677 | | 10/2015 |
| EP | 2290564 | | 3/2011 |
| EP | 2341709 | | 7/2011 |
| EP | 2276260 | B1 | 1/2013 |
| EP | 3089161 | | 11/2016 |
| JP | H07-46140 | | 2/1995 |
| JP | H11234068 | A | 8/1999 |
| JP | H11-330980 | | 11/1999 |
| JP | 2008536193 | A | 9/2008 |
| JP | 2012-504260 | | 2/2012 |
| JP | 2013519918 | A | 5/2013 |
| JP | 3186472 | | 10/2013 |
| JP | 2015-531498 | | 11/2015 |
| KR | 2001-0050679 | | 6/2001 |
| KR | 20060045675 | | 5/2006 |
| KR | 20060046675 | A | 5/2006 |
| KR | 20070121813 | | 12/2007 |
| RU | 2183034 | | 5/2002 |
| RU | 2010154747 | | 7/2012 |
| WO | 02/091361 | | 11/2002 |
| WO | 2006/113062 | | 10/2006 |
| WO | 2011/131732 | | 10/2011 |
| WO | 2012/045816 | | 4/2012 |
| WO | 2012075246 | A2 | 6/2012 |
| WO | 2010082508 | A1 | 7/2012 |
| WO | 2013/006342 | | 1/2013 |
| WO | 2013006338 | A2 | 1/2013 |
| WO | 2013/078056 | | 5/2013 |
| WO | 2014/111290 | | 7/2014 |
| WO | 2014/160849 | | 10/2014 |
| WO | 2014/160895 | | 10/2014 |
| WO | 2015/059087 | | 4/2015 |
| WO | 2015/088697 | | 6/2015 |
| WO | 2015/144587 | | 10/2015 |
| WO | 2015/148046 | | 10/2015 |
| WO | 2016/075053 | | 5/2016 |
| WO | 2016/193033 | | 12/2016 |
| WO | 2016/202682 | | 12/2016 |
| WO | 2017/023423 | | 2/2017 |
| WO | 2017/023601 | | 2/2017 |
| WO | 2017/058731 | | 4/2017 |
| WO | 2016/002738 | | 5/2017 |

OTHER PUBLICATIONS

"ATSC Standard Digital Audio Compression (AC-3, E-AC-3)" Dec. 17, 2012, 270 pages.
"SMPTE Registered Disclosure Document for Television—Description and Guide to the Use of the Dolby E Audio Metadata Serial Bitstream" Jan. 1, 2009, pp. 1-53.
"Specification of the Broadcast Wave Format: a format for Audio Data Files—Supplement 6: Dolby Metadata, EBU—Tech 3285 Suppl 6" Oct. 1, 2009, pp. 1-92.
Dolby Laboratories Inc. "Dolby Digital Professional Encoding Guidelines" Issue 1, S00/12972, 2000, 174 pages.
Ebu, "Digital Audio Compression (AC-3, Enhanced AC-3) Standard", ETSI TS 102 366, V1.2.1. Aug. 2008.
Kudumakis—107th MPEG San Jose (CA), USA, Jan. 13-17, 2014, Meeting Report Panos Kudumakis qMedia, Queen Mary University of London (7 pgs.).
Kudumakis—108th MPEG Valencia, Spain, Mar. 31-Apr. 4, 2014, Meeting Report Panos Kudumakis qMedia, Queen Mary University of London (9 pgs.).

* cited by examiner

AUDIO ENCODER AND DECODER WITH DYNAMIC RANGE COMPRESSION METADATA

CROSS REFERENCE TO RELATED APPLICATIONS

This application is a continuation of U.S. patent application Ser. No. 17/878,410, filed Aug. 1, 2022, which is a continuation of U.S. patent application Ser. No. 16/820,160, filed Mar. 16, 2020 (now U.S. Pat. No. 11,404,071), which is a continuation of U.S. patent application Ser. No. 15/694,568, filed Sep. 1, 2017 (now abandoned), which is a continuation of U.S. patent application Ser. No. 15/187,310, filed Jun. 20, 2016 (now U.S. Pat. No. 10,147,436), which is a continuation of U.S. patent application Ser. No. 14/770,375, filed Aug. 25, 2015 (now U.S. Pat. No. 10,037,763), which in turn is the 371 national stage of PCT/US2014/042168, filed Jun. 12, 2014. PCT Application No. PCT/US2014/042168 claims priority to United States Provisional Patent Application No. 61/836,865, filed on Jun. 19, 2013, each of which is hereby incorporated by reference in its entirety.

TECHNICAL FIELD

The invention pertains to audio signal processing, and more particularly, to encoding and decoding of audio data bitstreams with metadata indicative of substream structure and/or program information regarding audio content indicated by the bitstreams. Some embodiments of the invention generate or decode audio data in one of the formats known as Dolby Digital (AC-3), Dolby Digital Plus (Enhanced AC-3 or E-AC-3), or Dolby E.

BACKGROUND OF THE INVENTION

Dolby, Dolby Digital, Dolby Digital Plus, and Dolby E are trademarks of Dolby Laboratories Licensing Corporation. Dolby Laboratories provides proprietary implementations of AC-3 and E-AC-3 known as Dolby Digital and Dolby Digital Plus, respectively.

Audio data processing units typically operate in a blind fashion and do not pay attention to the processing history of audio data that occurs before the data is received. This may work in a processing framework in which a single entity does all the audio data processing and encoding for a variety of target media rendering devices while a target media rendering device does all the decoding and rendering of the encoded audio data. However, this blind processing does not work well (or at all) in situations where a plurality of audio processing units are scattered across a diverse network or are placed in tandem (i.e., chain) and are expected to optimally perform their respective types of audio processing. For example, some audio data may be encoded for high performance media systems and may have to be converted to a reduced form suitable for a mobile device along a media processing chain. Accordingly, an audio processing unit may unnecessarily perform a type of processing on the audio data that has already been performed. For instance, a volume leveling unit may perform processing on an input audio clip, irrespective of whether or not the same or similar volume leveling has been previously performed on the input audio clip. As a result, the volume leveling unit may perform leveling even when it is not necessary. This unnecessary processing may also cause degradation and/or the removal of specific features while rendering the content of the audio data.

BRIEF DESCRIPTION OF THE INVENTION

In a class of embodiments, the invention is an audio processing unit capable of decoding an encoded bitstream that includes substream structure metadata and/or program information metadata (and optionally also other metadata, e.g., loudness processing state metadata) in at least one segment of at least one frame of the bitstream and audio data in at least one other segment of the frame. Herein, substream structure metadata (or "SSM") denotes metadata of an encoded bitstream (or set of encoded bitstreams) indicative of substream structure of audio content of the encoded bitstream(s), and "program information metadata" (or "PIM") denotes metadata of an encoded audio bitstream indicative of at least one audio program (e.g., two or more audio programs), where the program information metadata is indicative of at least one property or characteristic of audio content of at least one said program (e.g., metadata indicating a type or parameter of processing performed on audio data of the program or metadata indicating which channels of the program are active channels).

In typical cases (e.g., in which the encoded bitstream is an AC-3 or E-AC-3 bitstream), the program information metadata (PIM) is indicative of program information which cannot practically be carried in other portions of the bitstream. For example, the PIM may be indicative of processing applied to PCM audio prior to encoding (e.g., AC-3 or E-AC-3 encoding), which frequency bands of the audio program have been encoded using specific audio coding techniques, and the compression profile used to create dynamic range compression (DRC) data in the bitstream.

In another class of embodiments, a method includes a step of multiplexing encoded audio data with SSM and/or PIM in each frame (or each of at least some frames) of the bitstream. In typical decoding, a decoder extracts the SSM and/or PIM from the bitstream (including by parsing and demultiplexing the SSM and/or PIM and the audio data) and processes the audio data to generate a stream of decoded audio data (and in some cases also performs adaptive processing of the audio data). In some embodiments, the decoded audio data and SSM and/or PIM are forwarded from the decoder to a post-processor configured to perform adaptive processing on the decoded audio data using the SSM and/or PIM.

In a class of embodiments, the inventive encoding method generates an encoded audio bitstream (e.g., an AC-3 or E-AC-3 bitstream) including audio data segments (e.g., the AB0-AB5 segments of the frame shown in FIG. 4 or all or some of segments AB0-AB5 of the frame shown in FIG. 7) which includes encoded audio data, and metadata segments (including SSM and/or PIM, and optionally also other metadata) time division multiplexed with the audio data segments. In some embodiments, each metadata segment (sometimes referred to herein as a "container") has a format which includes a metadata segment header (and optionally also other mandatory or "core" elements), and one or more metadata payloads following the metadata segment header. SIM, if present, is included in one of the metadata payloads (identified by a payload header, and typically having format of a first type). PIM, if present, is included in another one of the metadata payloads (identified by a payload header and typically having format of a second type). Similarly, each other type of metadata (if present) is included in another one of the metadata payloads (identified by a payload header and typically having format specific to the type of metadata). The exemplary format allows convenient access to the SSM, PIM, and other metadata at times other than during decoding (e.g., by a post-processor following decoding, or by a processor configured to recognize the metadata without performing full decoding on the encoded bitstream), and allows convenient and efficient error detection and correction (e.g., of substream identification) during decoding of the bitstream. For example, without access to SSM in the exemplary format, a decoder might incorrectly identify the correct number of substreams associated with a program. One metadata payload in a metadata segment may include SSM, another metadata payload in the metadata segment may include PIM, and optionally also at least one other metadata payload in the metadata segment may include other metadata (e.g., loudness processing state metadata or "LPSM").

In another class of embodiments, an audio processing unit (APU) is disclosed. The APU includes a buffer memory configured to store at least one frame of an encoded audio bitstream, where the encoded audio bitstream includes audio data and a metadata container. The metadata container includes a header and one or more metadata payloads after the header. The one or more metadata payloads include dynamic range compression (DRC) metadata, and the DRC metadata is or includes profile metadata indicative of whether the DRC metadata includes dynamic range compression (DRC) control values for use in performing dynamic range compression in accordance with at least one compression profile on audio content indicated by at least one block of the audio data. If the profile metadata indicates that the DRC metadata includes DRC control values for use in performing dynamic range compression in accordance with one said compression profile, the DRC metadata also includes a set of DRC control values generated in accordance with the compression profile. The APU also includes a parser coupled to the buffer memory and configured to parse the encoded audio bitstream. The APU further includes a subsystem coupled to the parser and configured to perform dynamic range compression, on at least some of the audio data or on decoded audio data generated by decoding said at least some of the audio data, using at least some of the DRC metadata.

NOTATION AND NOMENCLATURE

Figure 1:
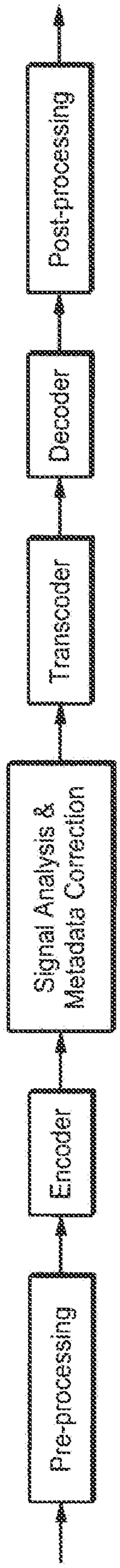
FIG. 1 is a block diagram of an embodiment of a system which may be configured to perform an embodiment of the inventive method.

Throughout this disclosure, including in the claims, the expression performing an operation "on" a signal or data (e.g., filtering, scaling, transforming, or applying gain to, the signal or data) is used in a broad sense to denote performing the operation directly on the signal or data, or on a processed version of the signal or data (e.g., on a version of the signal that has undergone preliminary filtering or pre-processing prior to performance of the operation thereon).

Throughout this disclosure including in the claims, the expression "system" is used in a broad sense to denote a device, system, or subsystem. For example, a subsystem that implements a decoder may be referred to as a decoder system, and a system including such a subsystem (e.g., a system that generates X output signals in response to multiple inputs, in which the subsystem generates M of the inputs and the other X−M inputs are received from an external source) may also be referred to as a decoder system.

Throughout this disclosure including in the claims, the term "processor" is used in a broad sense to denote a system or device programmable or otherwise configurable (e.g., with software or firmware) to perform operations on data (e.g., audio, or video or other image data). Examples of processors include a field-programmable gate array (or other configurable integrated circuit or chip set), a digital signal processor programmed and/or otherwise configured to perform pipelined processing on audio or other sound data, a programmable general purpose processor or computer, and a programmable microprocessor chip or chip set.

Throughout this disclosure including in the claims, the expressions "audio processor" and "audio processing unit" are used interchangeably, and in a broad sense, to denote a system configured to process audio data. Examples of audio processing units include, but are not limited to encoders (e.g., transcoders), decoders, codecs, pre-processing systems, post-processing systems, and bitstream processing systems (sometimes referred to as bitstream processing tools).

Throughout this disclosure including in the claims, the expression "metadata" (of an encoded audio bitstream) refers to separate and different data from corresponding audio data of the bitstream.

Throughout this disclosure including in the claims, the expression "substream structure metadata" (or "SSM") denotes metadata of an encoded audio bitstream (or set of encoded audio bitstreams) indicative of substream structure of audio content of the encoded bitstream(s).

Throughout this disclosure including in the claims, the expression "program information metadata" (or "PIM") denotes metadata of an encoded audio bitstream indicative of at least one audio program (e.g., two or more audio programs), where said metadata is indicative of at least one property or characteristic of audio content of at least one said program (e.g., metadata indicating a type or parameter of processing performed on audio data of the program or metadata indicating which channels of the program are active channels).

Throughout this disclosure including in the claims, the expression "processing state metadata" (e.g., as in the expression "loudness processing state metadata") refers to metadata (of an encoded audio bitstream) associated with audio data of the bitstream, indicates the processing state of corresponding (associated) audio data (e.g., what type(s) of processing have already been performed on the audio data), and typically also indicates at least one feature or characteristic of the audio data. The association of the processing state metadata with the audio data is time-synchronous. Thus, present (most recently received or updated) processing state metadata indicates that the corresponding audio data contemporaneously comprises the results of the indicated type(s) of audio data processing. In some cases, processing state metadata may include processing history and/or some or all of the parameters that are used in and/or derived from the indicated types of processing. Additionally, processing state metadata may include at least one feature or characteristic of the corresponding audio data, which has been computed or extracted from the audio data. Processing state metadata may also include other metadata that is not related to or derived from any processing of the corresponding audio data. For example, third party data, tracking information, identifiers, proprietary or standard information, user annotation data, user preference data, etc. may be added by a particular audio processing unit to pass on to other audio processing units.

Throughout this disclosure including in the claims, the expression "loudness processing state metadata" (or "LPSM") denotes processing state metadata indicative of the loudness processing state of corresponding audio data (e.g. what type(s) of loudness processing have been performed on the audio data) and typically also at least one feature or characteristic (e.g., loudness) of the corresponding audio data. Loudness processing state metadata may include data (e.g., other metadata) that is not (i.e., when it is considered alone) loudness processing state metadata.

Throughout this disclosure including in the claims, the expression "channel" (or "audio channel") denotes a monophonic audio signal.

Throughout this disclosure including in the claims, the expression "audio program" denotes a set of one or more audio channels and optionally also associated metadata (e.g., metadata that describes a desired spatial audio presentation, and/or PIM, and/or SSM, and/or LPSM, and/or program boundary metadata).

Throughout this disclosure including in the claims, the expression "program boundary metadata" denotes metadata of an encoded audio bitstream, where the encoded audio bitstream is indicative of at least one audio program (e.g., two or more audio programs), and the program boundary metadata is indicative of location in the bitstream of at least one boundary (beginning and/or end) of at least one said audio program. For example, the program boundary metadata (of an encoded audio bitstream indicative of an audio program) may include metadata indicative of the location (e.g., the start of the "N"th frame of the bitstream, or the "M"th sample location of the bitstream's "N"th frame) of the beginning of the program, and additional metadata indicative of the location (e.g., the start of the "J"th frame of the bitstream, or the "K"th sample location of the bitstream's "J"th frame) of the program's end.

Throughout this disclosure including in the claims, the term "couples" or "coupled" is used to mean either a direct or indirect connection. Thus, if a first device couples to a second device, that connection may be through a direct connection, or through an indirect connection via other devices and connections.

Detailed Description of Embodiments of the Invention

A typical stream of audio data includes both audio content (e.g., one or more channels of audio content) and metadata indicative of at least one characteristic of the audio content. For example, in an AC-3 bitstream there are several audio metadata parameters that are specifically intended for use in changing the sound of the program delivered to a listening environment. One of the metadata parameters is the DIALNORM parameter, which is intended to indicate the mean level of dialog in an audio program, and is used to determine audio playback signal level.

During playback of a bitstream comprising a sequence of different audio program segments (each having a different DIALNORM parameter), an AC-3 decoder uses the DIALNORM parameter of each segment to perform a type of loudness processing in which it modifies the playback level or loudness of such that the perceived loudness of the dialog of the sequence of segments is at a consistent level. Each encoded audio segment (item) in a sequence of encoded audio items would (in general) have a different DIALNORM parameter, and the decoder would scale the level of each of the items such that the playback level or loudness of the dialog for each item is the same or very similar, although this might require application of different amounts of gain to different ones of the items during playback.

DIALNORM typically is set by a user, and is not generated automatically, although there is a default DIALNORM value if no value is set by the user. For example, a content creator may make loudness measurements with a device external to an AC-3 encoder and then transfer the result (indicative of the loudness of the spoken dialog of an audio program) to the encoder to set the DIALNORM value. Thus, there is reliance on the content creator to set the DIALNORM parameter correctly.

There are several different reasons why the DIALNORM parameter in an AC-3 bitstream may be incorrect. First, each AC-3 encoder has a default DIALNORM value that is used during the generation of the bitstream if a DIALNORM value is not set by the content creator. This default value may be substantially different than the actual dialog loudness level of the audio. Second, even if a content creator measures loudness and sets the DIALNORM value accordingly, a loudness measurement algorithm or meter may have been used that does not conform to the recommended AC-3 loudness measurement method, resulting in an incorrect DIALNORM value. Third, even if an AC-3 bitstream has been created with the DIALNORM value measured and set correctly by the content creator, it may have been changed to an incorrect value during transmission and/or storage of the bitstream. For example, it is not uncommon in television broadcast applications for AC-3 bitstreams to be decoded, modified and then re-encoded using incorrect DIALNORM metadata information. Thus, a DIALNORM value included in an AC-3 bitstream may be incorrect or inaccurate and therefore may have a negative impact on the quality of the listening experience.

Further, the DIALNORM parameter does not indicate the loudness processing state of corresponding audio data (e.g. what type(s) of loudness processing have been performed on the audio data). Loudness processing state metadata (in the format in which it is provided in some embodiments of the present invention) is useful to facilitate adaptive loudness processing of an audio bitstream and/or verification of validity of the loudness processing state and loudness of the audio content, in a particularly efficient manner.

Although the present invention is not limited to use with an AC-3 bitstream, an E-AC-3 bitstream, or a Dolby E bitstream, for convenience it will be described in embodiments in which it generates, decodes, or otherwise processes such a bitstream.

An AC-3 encoded bitstream comprises metadata and one to six channels of audio content. The audio content is audio data that has been compressed using perceptual audio coding. The metadata includes several audio metadata parameters that are intended for use in changing the sound of a program delivered to a listening environment.

Each frame of an AC-3 encoded audio bitstream contains audio content and metadata for 1536 samples of digital audio. For a sampling rate of 48 kHz, this represents 32 milliseconds of digital audio or a rate of 31.25 frames per second of audio.

Each frame of an E-AC-3 encoded audio bitstream contains audio content and metadata for 256, 512, 768 or 1536 samples of digital audio, depending on whether the frame contains one, two, three or six blocks of audio data respectively. For a sampling rate of 48 kHz, this represents 5.333, 10.667, 16 or 32 milliseconds of digital audio respectively or a rate of 189.9, 93.75, 62.5 or 31.25 frames per second of audio respectively.

Figure 4:
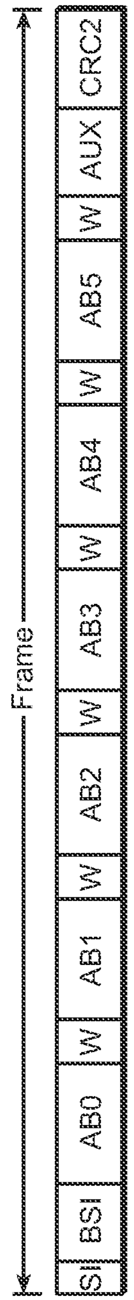
FIG. 4 is a diagram of an AC-3 frame, including the segments into which it is divided.
Figure 5:
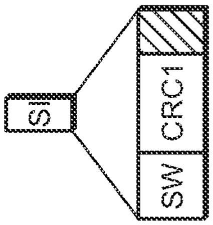
FIG. 5 is a diagram of the Synchronization Information (SI) segment of an AC-3 frame, including segments into which it is divided.

As indicated in FIG. 4, each AC-3 frame is divided into sections (segments), including: a Synchronization Information (SI) section which contains (as shown in FIG. 5) a synchronization word (SW) and the first of two error correction words (CRC1); a Bitstream Information (BSI) section which contains most of the metadata; six Audio Blocks (AB0 to AB5) which contain data compressed audio content (and can also include metadata); waste bit segments (W) (also known as "skip fields") which contain any unused bits left over after the audio content is compressed; an Auxiliary (AUX) information section which may contain more metadata; and the second of two error correction words (CRC2).

Figure 7:
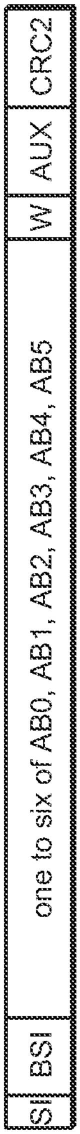
FIG. 7 is a diagram of an E-AC-3 frame, including segments into which it is divided.

As indicated in FIG. 7, each E-AC-3 frame is divided into sections (segments), including: a Synchronization Information (SI) section which contains (as shown in FIG. 5) a synchronization word (SW); a Bitstream Information (BSI) section which contains most of the metadata; between one and six Audio Blocks (AB0 to AB5) which contain data compressed audio content (and can also include metadata); waste bit segments (W) (also known as "skip fields") which contain any unused bits left over after the audio content is compressed (although only one waste bit segment is shown, a different waste bit or skip field segment would typically follow each audio block); an Auxiliary (AUX) information section which may contain more metadata; and an error correction word (CRC).

In an AC-3 (or E-AC-3) bitstream there are several audio metadata parameters that are specifically intended for use in changing the sound of the program delivered to a listening environment. One of the metadata parameters is the DIALNORM parameter, which is included in the BSI segment.

Figure 6:
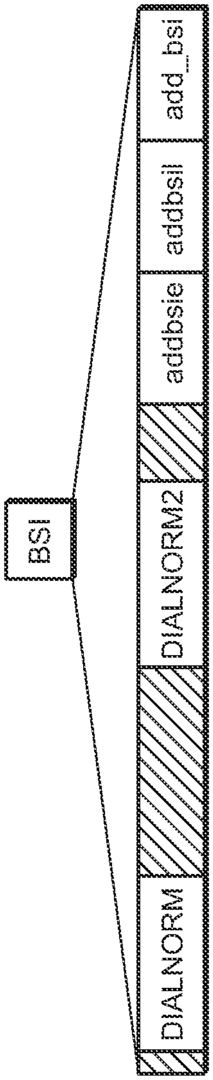
FIG. 6 is a diagram of the Bitstream Information (BSI) segment of an AC-3 frame, including segments into which it is divided.

As shown in FIG. 6, the BSI segment of an AC-3 frame includes a five-bit parameter ("DIALNORM") indicating the DIALNORM value for the program. A five-bit parameter ("DIALNORM2") indicating the DIALNORM value for a second audio program carried in the same AC-3 frame is included if the audio coding mode ("acmod") of the AC-3 frame is "0", indicating that a dual-mono or "1+1" channel configuration is in use.

The BSI segment also includes a flag ("addbsie") indicating the presence (or absence) of additional bit stream information following the "addbsie" bit, a parameter ("addbsil") indicating the length of any additional bit stream information following the "addbsil" value, and up to 64 bits of additional bit stream information ("addbsi") following the "addbsil" value.

The BSI segment includes other metadata values not specifically shown in FIG. 6.

In accordance with a class of embodiments, an encoded audio bitstream is indicative of multiple substreams of audio content. In some cases, the substreams are indicative of audio content of a multichannel program, and each of the substreams is indicative of one or more of the program's channels. In other cases, multiple substreams of an encoded audio bitstream are indicative of audio content of several audio programs, typically a "main" audio program (which may be a multichannel program) and at least one other audio program (e.g., a program which is a commentary on the main audio program).

An encoded audio bitstream which is indicative of at least one audio program necessarily includes at least one "independent" substream of audio content. The independent substream is indicative of at least one channel of an audio program (e.g., the independent substream may be indicative of the five full range channels of a conventional 5.1 channel audio program). Herein, this audio program is referred to as a "main" program.

In some classes of embodiments, an encoded audio bitstream is indicative of two or more audio programs (a "main" program and at least one other audio program). In such cases, the bitstream includes two or more independent substreams: a first independent substream indicative of at least one channel of the main program; and at least one other independent substream indicative of at least one channel of another audio program (a program distinct from the main program). Each independent bitstream can be independently decoded, and a decoder could operate to decode only a subset (not all) of the independent substreams of an encoded bitstream.

In a typical example of an encoded audio bitstream which is indicative of two independent substreams, one of the independent substreams is indicative of standard format speaker channels of a multichannel main program (e.g., Left, Right, Center, Left Surround, Right Surround full range speaker channels of a 5.1 channel main program), and the other independent substream is indicative of a monophonic audio commentary on the main program (e.g., a director's commentary on a movie, where the main program is the movie's soundtrack). In another example of an encoded audio bitstream indicative of multiple independent substreams, one of the independent substreams is indicative of standard format speaker channels of a multichannel main program (e.g., a 5.1 channel main program) including dialog in a first language (e.g., one of the speaker channels of the main program may be indicative of the dialog), and each other independent substream is indicative of a monophonic translation (into a different language) of the dialog.

Optionally, an encoded audio bitstream which is indicative of a main program (and optionally also at least one other audio program) includes at least one "dependent" substream of audio content. Each dependent substream is associated with one independent substream of the bitstream, and is indicative of at least one additional channel of the program (e.g., the main program) whose content is indicated by the associated independent substream (i.e., the dependent substream is indicative of at least one channel of a program which is not indicated by the associated independent substream, and the associated independent substream is indicative of at least one channel of the program).

In an example of an encoded bitstream which includes an independent substream (indicative of at least one channel of a main program), the bitstream also includes a dependent substream (associated with the independent bitstream) which is indicative of one or more additional speaker channels of the main program. Such additional speaker channels are additional to the main program channel(s) indicated by the independent substream. For example, if the independent substream is indicative of standard format Left, Right, Center, Left Surround, Right Surround full range speaker channels of a 7.1 channel main program, the dependent substream may be indicative of the two other full range speaker channels of the main program.

In accordance with the E-AC-3 standard, an E-AC-3 bitstream must be indicative of at least one independent substream (e.g., a single AC-3 bitstream), and may be indicative of up to eight independent substreams. Each independent substream of an E-AC-3 bitstream may be associated with up to eight dependent substreams.

An E-AC-3 bitstream includes metadata indicative of the bitstream's substream structure. For example, a "chanmap" field in the Bitstream Information (BSI) section of an E-AC-3 bitstream determines a channel map for the program channels indicated by a dependent substream of the bitstream. However, metadata indicative of substream structure is conventionally included in an E-AC-3 bitstream in such a format that it is convenient for access and use (during decoding of the encoded E-AC-3 bitstream) only by an E-AC-3 decoder; not for access and use after decoding (e.g., by a post-processor) or before decoding (e.g., by a processor configured to recognize the metadata). Also, there is a risk that a decoder may incorrectly identify the substreams of a conventional E-AC-3 encoded bitstream using the conventionally included metadata, and it had not been known until the present invention how to include substream structure metadata in an encoded bitstream (e.g., an encoded E-AC-3 bitstream) in such a format as to allow convenient and efficient detection and correction of errors in substream identification during decoding of the bitstream.

An E-AC-3 bitstream may also include metadata regarding the audio content of an audio program. For example, an E-AC-3 bitstream indicative of an audio program includes metadata indicative of minimum and maximum frequencies to which spectral extension processing (and channel coupling encoding) has been employed to encode content of the program. However, such metadata is generally included in an E-AC-3 bitstream in such a format that it is convenient for access and use (during decoding of the encoded E-AC-3 bitstream) only by an E-AC-3 decoder; not for access and use after decoding (e.g., by a post-processor) or before decoding (e.g., by a processor configured to recognize the metadata). Also, such metadata is not included in an E-AC-3 bitstream in a format that allows convenient and efficient error detection and error correction of the identification of such metadata during decoding of the bitstream.

In accordance with typical embodiments of the invention, PIM and/or SSM (and optionally also other metadata, e.g., loudness processing state metadata or "LPSM") are embedded in one or more reserved fields (or slots) of metadata segments of an audio bitstream which also includes audio data in other segments (audio data segments). Typically, at least one segment of each frame of the bitstream includes PIM or SSM, and at least one other segment of the frame includes corresponding audio data (i.e., audio data whose substream structure is indicated by the SSM and/or having at least one characteristic or property indicated by the PIM).

Figure 8:
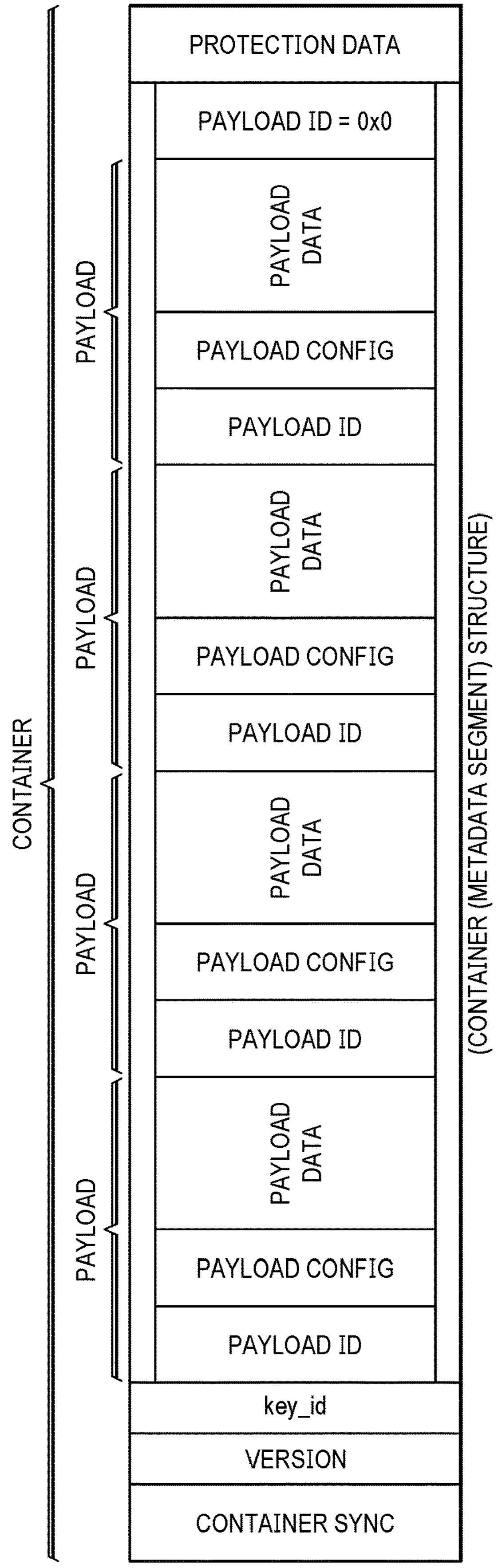
FIG. 8 is a diagram of a metadata segment of an encoded bitstream generated in accordance with an embodiment of the invention, including a metadata segment header comprising a container sync word (identified as "container sync" in FIG. 8) and version and key ID values, followed by multiple metadata payloads and protection bits.

In a class of embodiments, each metadata segment is a data structure (sometimes referred to herein as a container) which may contain one or more metadata payloads. Each payload includes a header including a specific payload identifier (and payload configuration data) to provide an unambiguous indication of the type of metadata present in the payload. The order of payloads within the container is undefined, so that payloads can be stored in any order and a parser must be able to parse the entire container to extract relevant payloads and ignore payloads that are either not relevant or are unsupported. FIG. 8 (to be described below) illustrates the structure of such a container and payloads within the container.

Communicating metadata (e.g., SSM and/or PIM and/or LPSM) in an audio data processing chain is particularly useful when two or more audio processing units need to work in tandem with one another throughout the processing chain (or content lifecycle). Without inclusion of metadata in an audio bitstream, severe media processing problems such as quality, level and spatial degradations may occur, for example, when two or more audio codecs are utilized in the chain and single-ended volume leveling is applied more than once during a bitstream path to a media consuming device (or a rendering point of the audio content of the bitstream).

Loudness processing state metadata (LPSM) embedded in an audio bitstream in accordance with some embodiments of the invention may be authenticated and validated, e.g., to enable loudness regulatory entities to verify if a particular program's loudness is already within a specified range and that the corresponding audio data itself have not been modified (thereby ensuring compliance with applicable regulations). A loudness value included in a data block comprising the loudness processing state metadata may be read out to verify this, instead of computing the loudness again. In response to LPSM, a regulatory agency may determine that corresponding audio content is in compliance (as indicated by the LPSM) with loudness statutory and/or regulatory requirements (e.g., the regulations promulgated under the Commercial Advertisement Loudness Mitigation Act, also known as the "CALM" Act) without the need to compute loudness of the audio content.

FIG. 1 is a block diagram of an exemplary audio processing chain (an audio data processing system), in which one or more of the elements of the system may be configured in accordance with an embodiment of the present invention. The system includes the followings elements, coupled together as shown: a pre-processing unit, an encoder, a signal analysis and metadata correction unit, a transcoder, a decoder, and a pre-processing unit. In variations on the system shown, one or more of the elements are omitted, or additional audio data processing units are included.

In some implementations, the pre-processing unit of FIG. 1 is configured to accept PCM (time-domain) samples comprising audio content as input, and to output processed PCM samples. The encoder may be configured to accept the PCM samples as input and to output an encoded (e.g., compressed) audio bitstream indicative of the audio content. The data of the bitstream that are indicative of the audio content are sometimes referred to herein as "audio data." If the encoder is configured in accordance with a typical embodiment of the present invention, the audio bitstream output from the encoder includes PIM and/or SSM (and optionally also loudness processing state metadata and/or other metadata) as well as audio data.

The signal analysis and metadata correction unit of FIG. 1 may accept one or more encoded audio bitstreams as input and determine (e.g., validate) whether metadata (e.g., processing state metadata) in each encoded audio bitstream is correct, by performing signal analysis (e.g., using program boundary metadata in an encoded audio bitstream). If the signal analysis and metadata correction unit finds that included metadata is invalid, it typically replaces the incorrect value(s) with the correct value(s) obtained from signal analysis. Thus, each encoded audio bitstream output from the signal analysis and metadata correction unit may include corrected (or uncorrected) processing state metadata as well as encoded audio data.

The transcoder of FIG. 1 may accept encoded audio bitstreams as input, and output modified (e.g., differently encoded) audio bitstreams in response (e.g., by decoding an input stream and re-encoding the decoded stream in a different encoding format). If the transcoder is configured in accordance with a typical embodiment of the present invention, the audio bitstream output from the transcoder includes SSM and/or PIM (and typically also other metadata) as well as encoded audio data. The metadata may have been included in the input bitstream.

The decoder of FIG. 1 may accept encoded (e.g., compressed) audio bitstreams as input, and output (in response) streams of decoded PCM audio samples. If the decoder is configured in accordance with a typical embodiment of the present invention, the output of the decoder in typical operation is or includes any of the following:

a stream of audio samples, and at least one corresponding stream of SSM and/or PIM (and typically also other metadata) extracted from an input encoded bitstream; or a stream of audio samples, and a corresponding stream of control bits determined from SSM and/or PIM (and typically also other metadata, e.g., LPSM) extracted from an input encoded bitstream; or a stream of audio samples, without a corresponding stream of metadata or control bits determined from metadata. In this last case, the decoder may extract metadata from the input encoded bitstream and perform it least one operation on the extracted metadata (e.g., validation), even though it does not output the extracted metadata or control bits determined therefrom.

By configuring the post-processing unit of FIG. 1 in accordance with a typical embodiment of the present invention, the post-processing unit is configured to accept a stream of decoded PCM audio samples, and to perform post processing thereon (e.g., volume leveling of the audio content) using SSM and/or PIM (and typically also other metadata, e.g., LPSM) received with the samples, or control bits determined by the decoder from metadata received with the samples. The post-processing unit is typically also configured to render the post-processed audio content for playback by one or more speakers.

Typical embodiments of the present invention provide an enhanced audio processing chain in which audio processing units (e.g., encoders, decoders, transcoders, and pre- and post-processing units) adapt their respective processing to be applied to audio data according to a contemporaneous state of the media data as indicated by metadata respectively received by the audio processing units.

The audio data input to any audio processing unit of the FIG. 1 system (e.g., the encoder or transcoder of FIG. 1) may include SSM and/or PIM (and optionally also other metadata) as well as audio data (e.g., encoded audio data). This metadata may have been included in the input audio by another element of the FIG. 1 system (or another source, not shown in FIG. 1) in accordance with an embodiment of the present invention. The processing unit which receives the input audio (with metadata) may be configured to perform it least one operation on the metadata (e.g., validation) or in response to the metadata (e.g., adaptive processing of the input audio), and typically also to include in its output audio the metadata, a processed version of the metadata, or control bits determined from the metadata.

A typical embodiment of the inventive audio processing unit (or audio processor) is configured to perform adaptive processing of audio data based on the state of the audio data as indicated by metadata corresponding to the audio data. In some embodiments, the adaptive processing is (or includes) loudness processing (if the metadata indicates that the loudness processing, or processing similar thereto, has not already been performed on the audio data, but is not (and does not include) loudness processing (if the metadata indicates that such loudness processing, or processing similar thereto, has already been performed on the audio data). In some embodiments, the adaptive processing is or includes metadata validation (e.g., performed in a metadata validation sub-unit) to ensure the audio processing unit performs other adaptive processing of the audio data based on the state of the audio data as indicated by the metadata. In some embodiments, the validation determines reliability of the metadata associated with (e.g., included in a bitstream with) the audio data. For example, if the metadata is validated to be reliable, then results from a type of previously performed audio processing may be re-used and new performance of the same type of audio processing may be avoided. On the other hand, if the metadata is found to have been tampered with (or otherwise unreliable), then the type of media processing purportedly previously performed (as indicated by the unreliable metadata) may be repeated by the audio processing unit, and/or other processing may be performed by the audio processing unit on the metadata and/or the audio data. The audio processing unit may also be configured to signal to other audio processing units downstream in an enhanced media processing chain that metadata (e.g., present in a media bitstream) is valid, if the unit determines that the metadata is valid (e.g., based on a match of a cryptographic value extracted and a reference cryptographic value).

Figure 2:
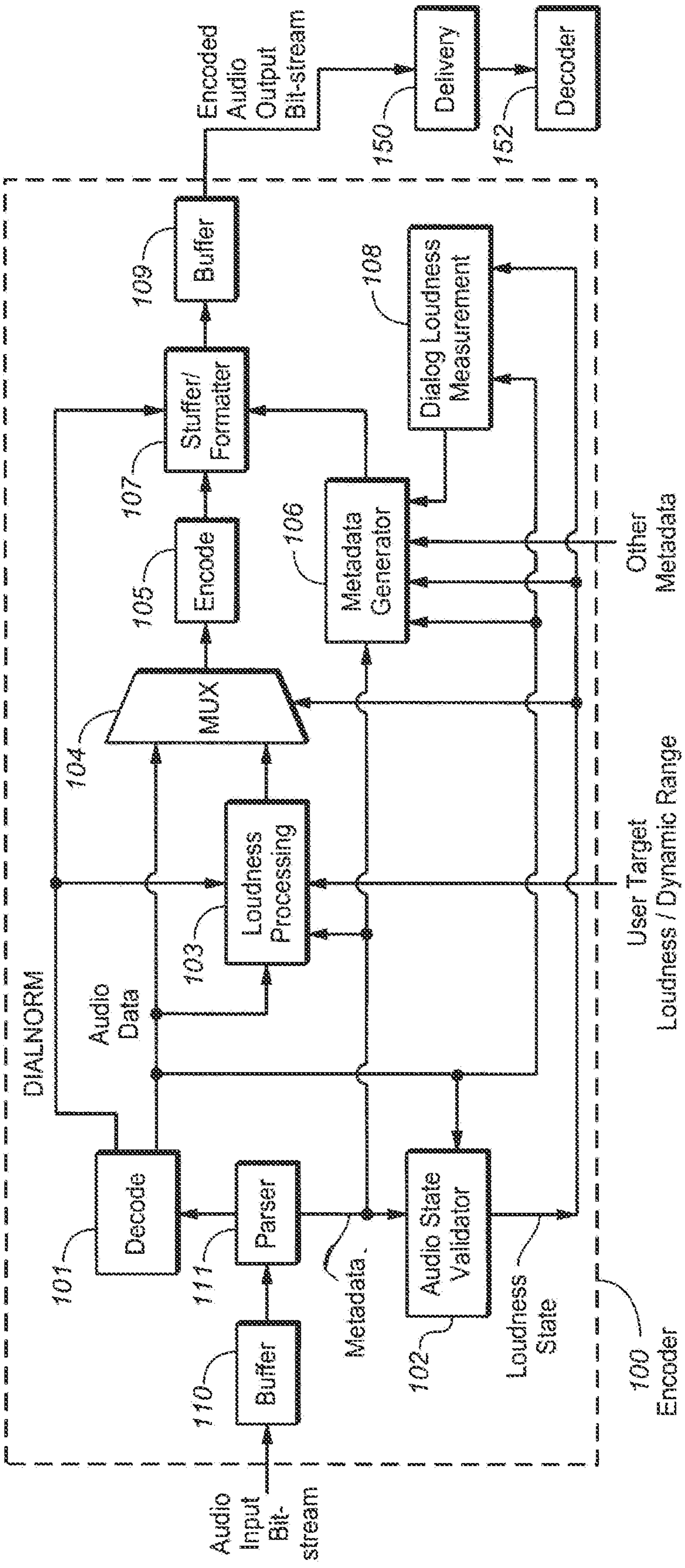
FIG. 2 is a block diagram of an encoder which is an embodiment of the inventive audio processing unit.

FIG. 2 is a block diagram of an encoder (100) which is an embodiment of the inventive audio processing unit. Any of the components or elements of encoder 100 may be implemented as one or more processes and/or one or more circuits (e.g., ASICs, FPGAs, or other integrated circuits), in hardware, software, or a combination of hardware and software. Encoder 100 comprises frame buffer 110, parser 111, decoder 101, audio state validator 102, loudness processing stage 103, audio stream selection stage 104, encoder 105, stuffer/formatter stage 107, metadata generation stage 106, dialog loudness measurement subsystem 108, and frame buffer 109, connected as shown. Typically also, encoder 100 includes other processing elements (not shown).

Encoder 100 (which is a transcoder) is configured to convert an input audio bitstream (which, for example, may be one of an AC-3 bitstream, an E-AC-3 bitstream, or a Dolby E bitstream) to an encoded output audio bitstream (which, for example, may be another one of an AC-3 bitstream, an E-AC-3 bitstream, or a Dolby E bitstream) including by performing adaptive and automated loudness processing using loudness processing state metadata included in the input bitstream. For example, encoder 100 may be configured to convert an input Dolby E bitstream (a format typically used in production and broadcast facilities but not in consumer devices which receive audio programs which have been broadcast thereto) to an encoded output audio bitstream (suitable for broadcasting to consumer devices) in AC-3 or E-AC-3 format.

The system of FIG. 2 also includes encoded audio delivery subsystem 150 (which stores and/or delivers the encoded bitstreams output from encoder 100) and decoder 152. An encoded audio bitstream output from encoder 100 may be stored by subsystem 150 (e.g., in the form of a DVD or Blu ray disc), or transmitted by subsystem 150 (which may implement a transmission link or network), or may be both stored and transmitted by subsystem 150. Decoder 152 is configured to decode an encoded audio bitstream (generated by encoder 100) which it receives via subsystem 150, including by extracting metadata (PIM and/or SSM, and optionally also loudness processing state metadata and/or other metadata) from each frame of the bitstream (and optionally also extracting program boundary metadata from the bitstream), and generating decoded audio data. Typically, decoder 152 is configured to perform adaptive processing on the decoded audio data using PIM and/or SSM, and/or LPSM (and optionally also program boundary metadata), and/or to forward the decoded audio data and metadata to a post-processor configured to perform adaptive processing on the decoded audio data using the metadata. Typically, decoder 152 includes a buffer which stores (e.g., in a non-transitory manner) the encoded audio bitstream received from subsystem 150.

Various implementations of encoder 100 and decoder 152 are configured to perform different embodiments of the inventive method. Frame buffer 110 is a buffer memory coupled to receive an encoded input audio bitstream. In operation, buffer 110 stores (e.g., in a non-transitory manner) at least one frame of the encoded audio bitstream, and a sequence of the frames of the encoded audio bitstream is asserted from buffer 110 to parser 111.

Parser 111 is coupled and configured to extract PIM and/or SSM, and loudness processing state metadata (LPSM), and optionally also program boundary metadata (and/or other metadata) from each frame of the encoded input audio in which such metadata is included, to assert at least the LPSM (and optionally also program boundary metadata and/or other metadata) to audio state validator 102, loudness processing stage 103, stage 106 and subsystem 108, to extract audio data from the encoded input audio, and to assert the audio data to decoder 101. Decoder 101 of encoder 100 is configured to decode the audio data to generate decoded audio data, and to assert the decoded audio data to loudness processing stage 103, audio stream selection stage 104, subsystem 108, and typically also to state validator 102.

State validator 102 is configured to authenticate and validate the LPSM (and optionally other metadata) asserted thereto. In some embodiments, the LPSM is (or is included in) a data block that has been included in the input bitstream (e.g., in accordance with an embodiment of the present invention). The block may comprise a cryptographic hash (a hash-based message authentication code or "HMAC") for processing the LPSM (and optionally also other metadata) and/or the underlying audio data (provided from decoder 101 to validator 102). The data block may be digitally signed in these embodiments, so that a downstream audio processing unit may relatively easily authenticate and validate the processing state metadata.

For example, the HMAC is used to generate a digest, and the protection value(s) included in the inventive bitstream may include the digest. The digest may be generated as follows for an AC-3 frame:

1. After AC-3 data and LPSM are encoded, frame data bytes (concatenated frame_data #1 and frame_data #2) and the LPSM data bytes are used as input for the hashing-function HMAC. Other data, which may be present inside an auxdata field, are not taken into consideration for calculating the digest. Such other data may be bytes neither belonging to the AC-3 data nor to the LSPSM data. Protection bits included in LPSM may not be considered for calculating the HMAC digest.
2. After the digest is calculated, it is written into the bitstream in a field reserved for protection bits.
3. The last step of the generation of the complete AC-3 frame is the calculation of the CRC-check. This is written at the very end of the frame and all data belonging to this frame is taken into consideration, including the LPSM bits.

Other cryptographic methods including but not limited to any of one or more non-HMAC cryptographic methods may be used for validation of LPSM and/or other metadata (e.g., in validator 102) to ensure secure transmission and receipt of the metadata and/or the underlying audio data. For example, validation (using such a cryptographic method) can be performed in each audio processing unit which receives an embodiment of the inventive audio bitstream to determine whether metadata and corresponding audio data included in the bitstream have undergone (and/or have resulted from) specific processing (as indicated by the metadata) and have not been modified after performance of such specific processing.

State validator 102 asserts control data to audio stream selection stage 104, metadata generator 106, and dialog loudness measurement subsystem 108, to indicate the results of the validation operation. In response to the control data, stage 104 may select (and pass through to encoder 105) either:

- the adaptively processed output of loudness processing stage 103 (e.g., when LPSM indicate that the audio data output from decoder 101 have not undergone a specific type of loudness processing, and the control bits from validator 102 indicate that the LPSM are valid); or
- the audio data output from decoder 101 (e.g., when LPSM indicate that the audio data output from decoder 101 have already undergone the specific type of loudness processing that would be performed by stage 103, and the control bits from validator 102 indicate that the LPSM are valid).

Stage 103 of encoder 100 is configured to perform adaptive loudness processing on the decoded audio data output from decoder 101, based on one or more audio data characteristics indicated by LPSM extracted by decoder 101. Stage 103 may be an adaptive transform-domain real time loudness and dynamic range control processor. Stage 103 may receive user input (e.g., user target loudness/dynamic range values or dialnorm values), or other metadata input (e.g., one or more types of third party data, tracking information, identifiers, proprietary or standard information, user annotation data, user preference data, etc.) and/or other input (e.g., from a fingerprinting process), and use such input to process the decoded audio data output from decoder 101. Stage 103 may perform adaptive loudness processing on decoded audio data (output from decoder 101) indicative of a single audio program (as indicated by program boundary metadata extracted by parser 111), and may reset the loudness processing in response to receiving decoded audio data (output from decoder 101) indicative of a different audio program as indicated by program boundary metadata extracted by parser 111.

Dialog loudness measurement subsystem 108 may operate to determine loudness of segments of the decoded audio (from decoder 101) which are indicative of dialog (or other speech), e.g., using LPSM (and/or other metadata) extracted by decoder 101, when the control bits from validator 102 indicate that the LPSM are invalid. Operation of dialog loudness measurement subsystem 108 may be disabled when the LPSM indicate previously determined loudness of dialog (or other speech) segments of the decoded audio (from decoder 101) when the control bits from validator 102 indicate that the LPSM are valid. Subsystem 108 may perform a loudness measurement on decoded audio data indicative of a single audio program (as indicated by program boundary metadata extracted by parser 111), and may reset the measurement in response to receiving decoded audio data indicative of a different audio program as indicated by such program boundary metadata.

Useful tools (e.g., the Dolby LM100 loudness meter) exist for measuring the level of dialog in audio content conveniently and easily. Some embodiments of the inventive APU (e.g., stage 108 of encoder 100) are implemented to include (or to perform the functions of) such a tool to measure the mean dialog loudness of audio content of an audio bitstream (e.g., a decoded AC-3 bitstream asserted to stage 108 from decoder 101 of encoder 100).

If stage 108 is implemented to measure the true mean dialog loudness of audio data, the measurement may include a step of isolating segments of the audio content that predominantly contain speech. The audio segments that predominantly are speech are then processed in accordance with a loudness measurement algorithm. For audio data decoded from an AC-3 bitstream, this algorithm may be a standard K-weighted loudness measure (in accordance with the international standard ITU-R BS.1770). Alternatively, other loudness measures may be used (e.g., those based on psychoacoustic models of loudness).

The isolation of speech segments is not essential to measure the mean dialog loudness of audio data. However, it improves the accuracy of the measure and typically provides more satisfactory results from a listener's perspective. Because not all audio content contains dialog (speech), the loudness measure of the whole audio content may provide a sufficient approximation of the dialog level of the audio, had speech been present.

Metadata generator 106 generates (and/or passes through to stage 107) metadata to be included by stage 107 in the encoded bitstream to be output from encoder 100. Metadata generator 106 may pass through to stage 107 the LPSM (and optionally also LIM and/or PIM and/or program boundary metadata and/or other metadata) extracted by encoder 101 and/or parser 111 (e.g., when control bits from validator 102 indicate that the LPSM and/or other metadata are valid), or generate new LIM and/or PIM and/or LPSM and/or program boundary metadata and/or other metadata and assert the new metadata to stage 107 (e.g., when control bits from validator 102 indicate that metadata extracted by decoder 101 are invalid), or it may assert to stage 107 a combination of metadata extracted by decoder 101 and/or parser 111 and newly generated metadata. Metadata generator 106 may include loudness data generated by subsystem 108, and at least one value indicative of the type of loudness processing performed by subsystem 108, in LPSM which it asserts to stage 107 for inclusion in the encoded bitstream to be output from encoder 100.

Metadata generator 106 may generate protection bits (which may consist of or include a hash-based message authentication code or "HMAC") useful for at least one of decryption, authentication, or validation of the LPSM (and optionally also other metadata) to be included in the encoded bitstream and/or the underlying audio data to be included in the encoded bitstream. Metadata generator 106 may provide such protection bits to stage 107 for inclusion in the encoded bitstream.

In typical operation, dialog loudness measurement subsystem 108 processes the audio data output from decoder 101 to generate in response thereto loudness values (e.g., gated and ungated dialog loudness values) and dynamic range values. In response to these values, metadata generator 106 may generate loudness processing state metadata (LPSM) for inclusion (by stuffer/formatter 107) into the encoded bitstream to be output from encoder 100.

Additionally, optionally, or alternatively, subsystems of 106 and/or 108 of encoder 100 may perform additional analysis of the audio data to generate metadata indicative of at least one characteristic of the audio data for inclusion in the encoded bitstream to be output from stage 107.

Encoder 105 encodes (e.g., by performing compression thereon) the audio data output from selection stage 104, and asserts the encoded audio to stage 107 for inclusion in the encoded bitstream to be output from stage 107.

Stage 107 multiplexes the encoded audio from encoder 105 and the metadata (including PIM and/or SSM) from generator 106 to generate the encoded bitstream to be output from stage 107, preferably so that the encoded bitstream has format as specified by a preferred embodiment of the present invention.

Frame buffer 109 is a buffer memory which stores (e.g., in a non-transitory manner) at least one frame of the encoded audio bitstream output from stage 107, and a sequence of the frames of the encoded audio bitstream is then asserted from buffer 109 as output from encoder 100 to delivery system 150.

LPSM generated by metadata generator 106 and included in the encoded bitstream by stage 107 is typically indicative of the loudness processing state of corresponding audio data (e.g., what type(s) of loudness processing have been performed on the audio data) and loudness (e.g., measured dialog loudness, gated and/or ungated loudness, and/or dynamic range) of the corresponding audio data.

Herein, "gating" of loudness and/or level measurements performed on audio data refers to a specific level or loudness threshold where computed value(s) that exceed the threshold are included in the final measurement (e.g., ignoring short term loudness values below −60 dBFS in the final measured values). Gating on an absolute value refers to a fixed level or loudness, whereas gating on a relative value refers to a value that is dependent on a current "ungated" measurement value.

In some implementations of encoder 100, the encoded bitstream buffered in memory 109 (and output to delivery system 150) is an AC-3 bitstream or an E-AC-3 bitstream, and comprises audio data segments (e.g., the AB0-AB5 segments of the frame shown in FIG. 4) and metadata segments, where the audio data segments are indicative of audio data, and each of at least some of the metadata segments includes PIM and/or SSM (and optionally also other metadata). Stage 107 inserts metadata segments (including metadata) into the bitstream in the following format. Each of the metadata segments which includes PIM and/or SSM is included in a waste bit segment of the bitstream (e.g., a waste bit segment "W" as shown in FIG. 4 or FIG. 7), or an "addbsi" field of the Bitstream Information ("BSI") segment of a frame of the bitstream, or in an auxdata field (e.g., the AUX segment shown in FIG. 4 or FIG. 7) at the end of a frame of the bitstream. A frame of the bitstream may include one or two metadata segments, each of which includes metadata, and if the frame includes two metadata segments, one may be present in the addbsi field of the frame and the other in the AUX field of the frame.

In some embodiments, each metadata segment (sometimes referred to herein as a "container") inserted by stage 107 has a format which includes a metadata segment header (and optionally also other mandatory or "core" elements), and one or more metadata payloads following the metadata segment header. SIM, if present, is included in one of the metadata payloads (identified by a payload header, and typically having format of a first type). PIM, if present, is included in another one of the metadata payloads (identified by a payload header and typically having format of a second type). Similarly, each other type of metadata (if present) is included in another one of the metadata payloads (identified by a payload header and typically having format specific to the type of metadata). The exemplary format allows convenient access to the SSM, PIM, and other metadata at times other than during decoding (e.g., by a post-processor following decoding, or by a processor configured to recognize the metadata without performing full decoding on the encoded bitstream), and allows convenient and efficient error detection and correction (e.g., of substream identification) during decoding of the bitstream. For example, without access to SSM in the exemplary format, a decoder might incorrectly identify the correct number of substreams associated with a program. One metadata payload in a metadata segment may include SSM, another metadata payload in the metadata segment may include PIM, and optionally also at least one other metadata payload in the metadata segment may include other metadata (e.g., loudness processing state metadata or "LPSM").

In some embodiments, a substream structure metadata (SSM) payload included (by stage 107) in a frame of an encoded bitstream (e.g., an E-AC-3 bitstream indicative of at least one audio program) includes SSM in the following format:

- a payload header, typically including at least one identification value (e.g., a 2-bit value indicative of SSM format version, and optionally also length, period, count, and substream association values); and after the header:

- independent substream metadata indicative of the number of independent substreams of the program indicated by the bitstream; and
- dependent substream metadata indicative of whether each independent substream of the program has at least one associated dependent substream (i.e., whether at least one dependent substream is associated with said each independent substream), and if so the number of dependent substreams associated with each independent substream of the program.

It is contemplated that an independent substream of an encoded bitstream may be indicative of a set of speaker channels of an audio program (e.g., the speaker channels of a 5.1 speaker channel audio program), and that each of one or more dependent substreams (associated with the independent substream, as indicated by dependent substream metadata) may be indicative of an object channel of the program. Typically, however, an independent substream of an encoded bitstream is indicative of a set of speaker channels of a program, and each dependent substream associated with the independent substream (as indicated by dependent substream metadata) is indicative of at least one additional speaker channel of the program.

In some embodiments, a program information metadata (PIM) payload included (by stage 107) in a frame of an encoded bitstream (e.g., an E-AC-3 bitstream indicative of at least one audio program) has the following format:

- a payload header, typically including at least one identification value (e.g., a value indicative of PIM format version, and optionally also length, period, count, and substream association values); and after the header, PIM in the following format:

- active channel metadata indicative of each silent channel and each non-silent channel of an audio program (i.e., which channel(s) of the program contain audio information, and which (if any) contain only silence (typically for the duration of the frame)). In embodiments in which the encoded bitstream is an AC-3 or E-AC-3 bitstream, the active channel metadata in a frame of the bitstream may be used in conjunction with additional metadata of the bitstream (e.g., the audio coding mode ("acmod") field of the frame, and, if present, the chanmap field in the frame or associated dependent substream frame(s)) to determine which channel(s) of the program contain audio information and which contain silence. The "acmod" field of an AC-3 or E-AC-3 frame indicates the number of full range channels of an audio program indicated by audio content of the frame (e.g., whether the program is a 1.0 channel monophonic program, a 2.0 channel stereo program, or a program comprising L, R, C, Ls, Rs full range channels), or that the frame is indicative of two independent 1.0 channel monophonic programs. A "chanmap" field of an E-AC-3 bitstream indicates a channel map for a dependent substream indicated by the bitstream. Active channel metadata may be useful for implementing upmixing (in a post-processor) downstream of a decoder, for example to add audio to channels that contain silence at the output of the decoder;
- downmix processing state metadata indicative of whether the program was downmixed (prior to or during encoding), and if so, the type of downmixing that was applied. Downmix processing state metadata may be useful for implementing upmixing (in a post-processor) downstream of a decoder, for example to upmix the audio content of the program using parameters that most closely match a type of downmixing that was applied. In embodiments in which the encoded bitstream is an AC-3 or E-AC-3 bitstream, the downmix processing state metadata may be used in conjunction with the audio coding mode ("acmod") field of the frame to determine the type of downmixing (if any) applied to the channel(s) of the program;
- upmix processing state metadata indicative of whether the program was upmixed (e.g., from a smaller number of channels) prior to or during encoding, and if so, the type of upmixing that was applied. Upmix processing state metadata may be useful for implementing downmixing (in a post-processor) downstream of a decoder, for example to downmix the audio content of the program in a manner that is compatible with a type of upmixing (e.g., Dolby Pro Logic, or Dolby Pro Logic II Movie Mode, or Dolby Pro Logic II Music Mode, or Dolby Professional Upmixer) that was applied to the program. In embodiments in which the encoded bitstream is an E-AC-3 bitstream, the upmix processing state metadata may be used in conjunction with other metadata (e.g., the value of a "strmtyp" field of the frame) to determine the type of upmixing (if any) applied to the channel(s) of the program. The value of the "strmtyp" field (in the BSI segment of a frame of an E-AC-3 bitstream) indicates whether audio content of the frame belongs to an independent stream (which determines a program) or an independent substream (of a program which includes or is associated with multiple substreams) and thus may be decoded independently of any other substream indicated by the E-AC-3 bitstream, or whether audio content of the frame belongs to a dependent substream (of a program which includes or is associated with multiple substreams) and thus must be decoded in conjunction with an independent substream with which it is associated; and preprocessing state metadata indicative of whether preprocessing was performed on audio content of the frame (before encoding of the audio content to generated the encoded bitstream), and if so the type of preprocessing that was performed.

In some implementations, the preprocessing state metadata is indicative of:

whether surround attenuation was applied (e.g., whether surround channels of the audio program were attenuated by 3 dB prior to encoding), whether 90 degree phase shift applied (e.g., to surround channels Ls and Rs channels of the audio program prior to encoding), whether a low-pass filter was applied to an LFE channel of the audio program prior to encoding, whether level of an LFE channel of the program was monitored during production and if so the monitored level of the LFE channel relative to level of the full range audio channels of the program, whether dynamic range compression should be performed (e.g., in the decoder) on each block of decoded audio content of the program and if so the type (and/or parameters) of dynamic range compression to be performed (e.g., this type of preprocessing state metadata may be indicative of which of the following compression profile types was assumed by the encoder to generate dynamic range compression control values that are included in the encoded bitstream: Film Standard, Film Light, Music Standard, Music Light, or Speech. Alternatively, this type of preprocessing state metadata may indicate that heavy dynamic range compression ("compr" compression) should be performed on each frame of decoded audio content of the program in a manner determined by dynamic range compression control values that are included in the encoded bitstream), whether spectral extension processing and/or channel coupling encoding was employed to encode specific frequency ranges of content of the program and if so the minimum and maximum frequencies of the frequency components of the content on which spectral extension encoding was performed, and the minimum and maximum frequencies of frequency components of the content on which channel coupling encoding was performed. This type of preprocessing state metadata information may be useful to perform equalization (in a post-processor) downstream of a decoder. Both channel coupling and spectral extension information are also useful for optimizing quality during transcode operations and applications. For example, an encoder may optimize its behavior (including the adaptation of pre-processing steps such as headphone virtualization, up mixing, etc.) based on the state of parameters, such as spectral extension and channel coupling information. Moreover, the encoder may would adapt its coupling and spectral extension parameters dynamically to match and/or to optimal values based on the state of the inbound (and authenticated) metadata, and whether dialog enhancement adjustment range data is included in the encoded bitstream, and if so the range of adjustment available during performance of dialog enhancement processing (e.g., in a post-processor downstream of a decoder) to adjust the level of dialog content relative to the level of non-dialog content in the audio program.

In some implementations, additional preprocessing state metadata (e.g., metadata indicative of headphone-related parameters) is included (by stage 107) in a PIM payload of an encoded bitstream to be output from encoder 100.

In some embodiments, an LPSM payload included (by stage 107) in a frame of an encoded bitstream (e.g., an E-AC-3 bitstream indicative of at least one audio program) includes LPSM in the following format:

a header (typically including a syncword identifying the start of the LPSM payload, followed by at least one identification value, e.g., the LPSM format version, length, period, count, and substream association values indicated in Table 2 below); and after the header, at least one dialog indication value (e.g., parameter "Dialog channel(s)" of Table 2) indicating whether corresponding audio data indicates dialog or does not indicate dialog (e.g., which channels of corresponding audio data indicate dialog);

at least one loudness regulation compliance value (e.g., parameter "Loudness Regulation Type" of Table 2) indicating whether corresponding audio data complies with an indicated set of loudness regulations;

at least one loudness processing value (e.g., one or more of parameters "Dialog gated Loudness Correction flag," "Loudness Correction Type," of Table 2) indicating at least one type of loudness processing which has been performed on the corresponding audio data; and at least one loudness value (e.g., one or more of parameters "ITU Relative Gated Loudness," "ITU Speech Gated Loudness," "ITU (EBU 3341) Short-term 3s Loudness," and "True Peak" of Table 2) indicating at least one loudness (e.g., peak or average loudness) characteristic of the corresponding audio data.

In some embodiments, each metadata segment which contains PIM and/or SSM (and optionally also other metadata) contains a metadata segment header (and optionally also additional core elements), and after the metadata segment header (or the metadata segment header and other core elements) at least one metadata payload segment having the following format:

a payload header, typically including at least one identification value (e.g., SSM or PIM format version, length, period, count, and substream association values), and after the payload header, the SSM or PIM (or metadata of another type).

In some implementations, each of the metadata segments (sometimes referred to herein as "metadata containers" or "containers") inserted by stage 107 into a waste bit/skip field segment (or an "addbsi" field or an auxdata field) of a frame of the bitstream has the following format:

a metadata segment header (typically including a syncword identifying the start of the metadata segment, followed by identification values, e.g., version, length, period, expanded element count, and substream association values as indicated in Table 1 below); and after the metadata segment header, at least one protection value (e.g., the HMAC digest and Audio Fingerprint values of Table 1) useful for at least one of decryption, authentication, or validation of at least one of metadata of the metadata segment or the corresponding audio data); and also after the metadata segment header, metadata payload identification ("ID") and payload configuration values which identify the type of metadata in each following metadata payload and indicate at least one aspect of configuration (e.g., size) of each such payload.

Each metadata payload follows the corresponding payload ID and payload configuration values.

In some embodiments, each of the metadata segments in the waste bit segment (or auxdata field or "addbsi" field) of a frame has three levels of structure:

a high level structure (e.g., a metadata segment header), including a flag indicating whether the waste bit (or auxdata or addbsi) field includes metadata, at least one ID value indicating what type(s) of metadata are present, and typically also a value indicating how many bits of metadata (e.g., of each type) are present (if metadata is present). One type of metadata that could be present is PIM, another type of metadata that could be present is SSM, and other types of metadata that could be present are LPSM, and/or program boundary metadata, and/or media research metadata;

an intermediate level structure, comprising data associated with each identified type of metadata (e.g., metadata payload header, protection values, and payload ID and payload configuration values for each identified type of metadata); and a low level structure, comprising a metadata payload for each identified type of metadata (e.g., a sequence of PIM values, if PIM is identified as being present, and/or metadata values of another type (e.g., SSM or LPSM), if this other type of metadata is identified as being present).

The data values in such a three level structure can be nested. For example, the protection value(s) for each payload (e.g., each PIM, or SSM, or other metadata payload) identified by the high and intermediate level structures can be included after the payload (and thus after the payload's metadata payload header), or the protection value(s) for all metadata payloads identified by the high and intermediate level structures can be included after the final metadata payload in the metadata segment (and thus after the metadata payload headers of all the payloads of the metadata segment).

In one example (to be described with reference to the metadata segment or "container" of FIG. 8), a metadata segment header identifies four metadata payloads. As shown in FIG. 8, the metadata segment header comprises a container sync word (identified as "container sync") and version and key ID values. The metadata segment header is followed by the four metadata payloads and protection bits. Payload ID and payload configuration (e.g., payload size) values for the first payload (e.g., a PIM payload) follow the metadata segment header, the first payload itself follows the ID and configuration values, payload ID and payload configuration (e.g., payload size) values for the second payload (e.g., an SSM payload) follow the first payload, the second payload itself follows these ID and configuration values, payload ID and payload configuration (e.g., payload size) values for the third payload (e.g., an LPSM payload) follow the second payload, the third payload itself follows these ID and configuration values, payload ID and payload configuration (e.g., payload size) values for the fourth payload, follow the third payload, the fourth payload itself follows these ID and configuration values, and protection value(s) (identified as "Protection Data" in FIG. 8) for all or some of the payloads (or for the high and intermediate level structure and all or some of the payloads) follow the last payload.

In some embodiments, if decoder 101 receives an audio bitstream generated in accordance with an embodiment of the invention with a cryptographic hash, the decoder is configured to parse and retrieve the cryptographic hash from a data block determined from the bitstream, where said block includes metadata. Validator 102 may use the cryptographic hash to validate the received bitstream and/or associated metadata. For example, if validator 102 finds the metadata to be valid based on a match between a reference cryptographic hash and the cryptographic hash retrieved from the data block, then it may disable operation of processor 103 on the corresponding audio data and cause selection stage 104 to pass through (unchanged) the audio data. Additionally, optionally, or alternatively, other types of cryptographic techniques may be used in place of a method based on a cryptographic hash.

Encoder 100 of FIG. 2 may determine (in response to LPSM, and optionally also program boundary metadata, extracted by decoder 101) that a post/pre-processing unit has performed a type of loudness processing on the audio data to be encoded (in elements 105, 106, and 107) and hence may create (in generator 106) loudness processing state metadata that includes the specific parameters used in and/or derived from the previously performed loudness processing. In some implementations, encoder 100 may create (and include in the encoded bitstream output therefrom) metadata indicative of processing history on the audio content so long as the encoder is aware of the types of processing that have been performed on the audio content.

Figure 3:
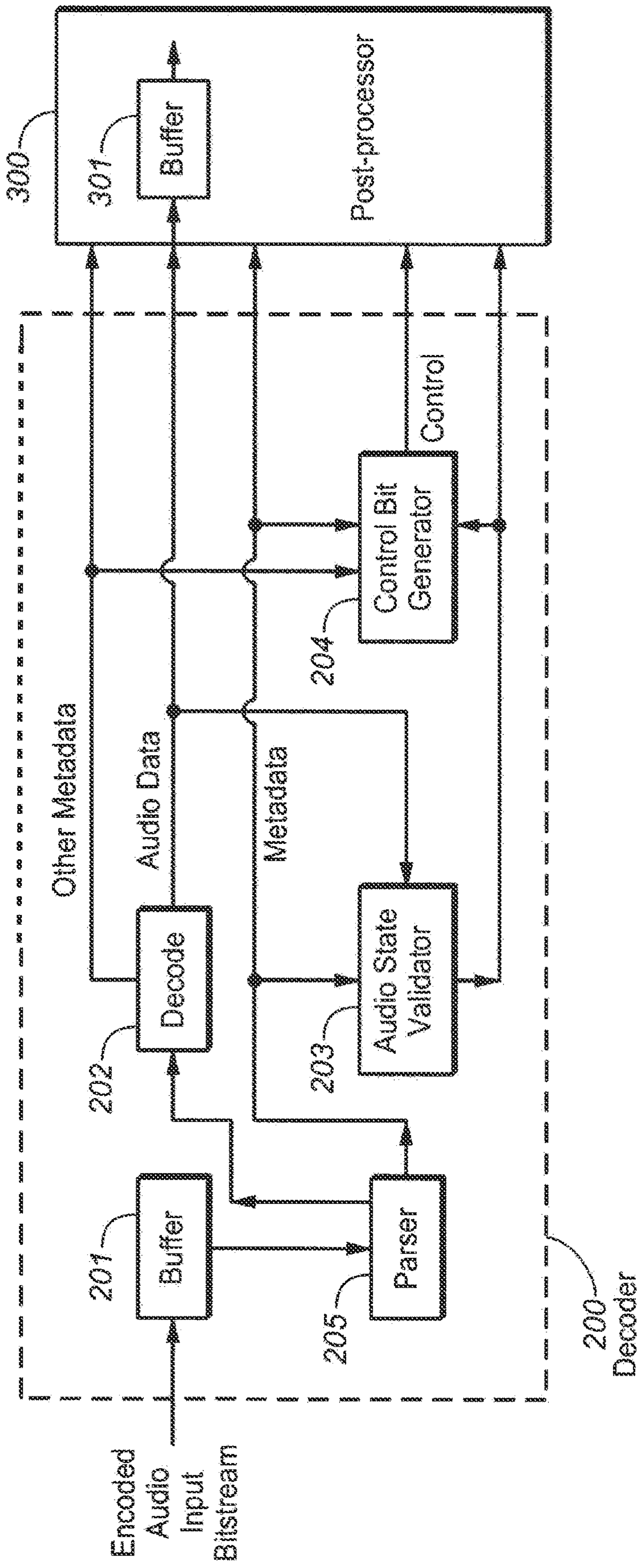
FIG. 3 is a block diagram of a decoder which is an embodiment of the inventive audio processing unit, and a post-processor coupled thereto which is another embodiment of the inventive audio processing unit.

FIG. 3 is a block diagram of a decoder (200) which is an embodiment of the inventive audio processing unit, and of a post-processor (300) coupled thereto. Post-processor (300) is also an embodiment of the inventive audio processing unit. Any of the components or elements of decoder 200 and post-processor 300 may be implemented as one or more processes and/or one or more circuits (e.g., ASICs, FPGAs, or other integrated circuits), in hardware, software, or a combination of hardware and software. Decoder 200 comprises frame buffer 201, parser 205, audio decoder 202, audio state validation stage (validator) 203, and control bit generation stage 204, connected as shown. Typically also, decoder 200 includes other processing elements (not shown).

Frame buffer 201 (a buffer memory) stores (e.g., in a non-transitory manner) at least one frame of the encoded audio bitstream received by decoder 200. A sequence of the frames of the encoded audio bitstream is asserted from buffer 201 to parser 205.

Parser 205 is coupled and configured to extract PIM and/or SSM (and optionally also other metadata, e.g., LPSM) from each frame of the encoded input audio, to assert at least some of the metadata (e.g., LPSM and program boundary metadata if any is extracted, and/or PIM and/or SSM) to audio state validator 203 and stage 204, to assert the extracted metadata as output (e.g., to post-processor 300), to extract audio data from the encoded input audio, and to assert the extracted audio data to decoder 202.

The encoded audio bitstream input to decoder 200 may be one of an AC-3 bitstream, an E-AC-3 bitstream, or a Dolby E bitstream.

The system of FIG. 3 also includes post-processor 300. Post-processor 300 comprises frame buffer 301 and other processing elements (not shown) including at least one processing element coupled to buffer 301. Frame buffer 301 stores (e.g., in a non-transitory manner) at least one frame of the decoded audio bitstream received by post-processor 300 from decoder 200. Processing elements of post-processor 300 are coupled and configured to receive and adaptively process a sequence of the frames of the decoded audio bitstream output from buffer 301, using metadata output from decoder 200 and/or control bits output from stage 204 of decoder 200. Typically, post-processor 300 is configured to perform adaptive processing on the decoded audio data using metadata from decoder 200 (e.g., adaptive loudness processing on the decoded audio data using LPSM values and optionally also program boundary metadata, where the adaptive processing may be based on loudness processing state, and/or one or more audio data characteristics, indicated by LPSM for audio data indicative of a single audio program).

Various implementations of decoder 200 and post-processor 300 are configured to perform different embodiments of the inventive method.

Audio decoder 202 of decoder 200 is configured to decode the audio data extracted by parser 205 to generate decoded audio data, and to assert the decoded audio data as output (e.g., to post-processor 300).

State validator 203 is configured to authenticate and validate the metadata asserted thereto. In some embodiments, the metadata is (or is included in) a data block that has been included in the input bitstream (e.g., in accordance with an embodiment of the present invention). The block may comprise a cryptographic hash (a hash-based message authentication code or "HMAC") for processing the metadata and/or the underlying audio data (provided from parser 205 and/or decoder 202 to validator 203). The data block may be digitally signed in these embodiments, so that a downstream audio processing unit may relatively easily authenticate and validate the processing state metadata.

Other cryptographic methods including but not limited to any of one or more non-HMAC cryptographic methods may be used for validation of metadata (e.g., in validator 203) to ensure secure transmission and receipt of the metadata and/or the underlying audio data. For example, validation (using such a cryptographic method) can be performed in each audio processing unit which receives an embodiment of the inventive audio bitstream to determine whether loudness processing state metadata and corresponding audio data included in the bitstream have undergone (and/or have resulted from) specific loudness processing (as indicated by the metadata) and have not been modified after performance of such specific loudness processing.

State validator 203 asserts control data to control bit generator 204, and/or asserts the control data as output (e.g., to post-processor 300), to indicate the results of the validation operation. In response to the control data (and optionally also other metadata extracted from the input bitstream), stage 204 may generate (and assert to post-processor 300) either:

- control bits indicating that decoded audio data output from decoder 202 have undergone a specific type of loudness processing (when LPSM indicate that the audio data output from decoder 202 have undergone the specific type of loudness processing, and the control bits from validator 203 indicate that the LPSM are valid); or
- control bits indicating that decoded audio data output from decoder 202 should undergo a specific type of loudness processing (e.g., when LPSM indicate that the audio data output from decoder 202 have not undergone the specific type of loudness processing, or when the LPSM indicate that the audio data output from decoder 202 have undergone the specific type of loudness processing but the control bits from validator 203 indicate that the LPSM are not valid).

Alternatively, decoder 200 asserts metadata extracted by decoder 202 from the input bitstream, and metadata extracted by parser 205 from the input bitstream to post-processor 300, and post-processor 300 performs adaptive processing on the decoded audio data using the metadata, or performs validation of the metadata and then performs adaptive processing on the decoded audio data using the metadata if the validation indicates that the metadata are valid.

In some embodiments, if decoder 200 receives an audio bitstream generated in accordance with an embodiment of the invention with cryptographic hash, the decoder is configured to parse and retrieve the cryptographic hash from a data block determined from the bitstream, said block comprising loudness processing state metadata (LPSM). Validator 203 may use the cryptographic hash to validate the received bitstream and/or associated metadata. For example, if validator 203 finds the LPSM to be valid based on a match between a reference cryptographic hash and the cryptographic hash retrieved from the data block, then it may signal to a downstream audio processing unit (e.g., post-processor 300, which may be or include a volume leveling unit) to pass through (unchanged) the audio data of the bitstream. Additionally, optionally, or alternatively, other types of cryptographic techniques may be used in place of a method based on a cryptographic hash.

In some implementations of decoder 200, the encoded bitstream received (and buffered in memory 201) is an AC-3 bitstream or an E-AC-3 bitstream, and comprises audio data segments (e.g., the AB0-AB5 segments of the frame shown in FIG. 4) and metadata segments, where the audio data segments are indicative of audio data, and each of at least some of the metadata segments includes PIM or SSM (or other metadata). Decoder stage 202 (and/or parser 205) is configured to extract the metadata from the bitstream. Each of the metadata segments which includes PIM and/or SSM (and optionally also other metadata) is included in a waste bit segment of a frame of the bitstream, or an "addbsi" field of the Bitstream Information ("BSI") segment of a frame of the bitstream, or in an auxdata field (e.g., the AUX segment shown in FIG. 4) at the end of a frame of the bitstream. A frame of the bitstream may include one or two metadata segments, each of which includes metadata, and if the frame includes two metadata segments, one may be present in the addbsi field of the frame and the other in the AUX field of the frame.

In some embodiments, each metadata segment (sometimes referred to herein as a "container") of the bitstream buffered in buffer 201 has a format which includes a metadata segment header (and optionally also other mandatory or "core" elements), and one or more metadata payloads following the metadata segment header. SIM, if present, is included in one of the metadata payloads (identified by a payload header, and typically having format of a first type). PIM, if present, is included in another one of the metadata payloads (identified by a payload header and typically having format of a second type). Similarly, each other type of metadata (if present) is included in another one of the metadata payloads (identified by a payload header and typically having format specific to the type of metadata). The exemplary format allows convenient access to the SSM, PIM, and other metadata at times other than during decoding (e.g., by post-processor 300 following decoding, or by a processor configured to recognize the metadata without performing full decoding on the encoded bitstream), and allows convenient and efficient error detection and correction (e.g., of substream identification) during decoding of the bitstream. For example, without access to SSM in the exemplary format, decoder 200 might incorrectly identify the correct number of substreams associated with a program. One metadata payload in a metadata segment may include SSM, another metadata payload in the metadata segment may include PIM, and optionally also at least one other metadata payload in the metadata segment may include other metadata (e.g., loudness processing state metadata or "LPSM").

In some embodiments, a substream structure metadata (SSM) payload included in a frame of an encoded bitstream (e.g., an E-AC-3 bitstream indicative of at least one audio program) buffered in buffer 201 includes SSM in the following format:

a payload header, typically including at least one identification value (e.g., a 2-bit value indicative of SSM format version, and optionally also length, period, count, and substream association values); and after the header:

independent substream metadata indicative of the number of independent substreams of the program indicated by the bitstream; and dependent substream metadata indicative of whether each independent substream of the program has at least one dependent substream associated with it, and if so the number of dependent substreams associated with each independent substream of the program.

In some embodiments, a program information metadata (PIM) payload included in a frame of an encoded bitstream (e.g., an E-AC-3 bitstream indicative of at least one audio program) buffered in buffer 201 has the following format:

a payload header, typically including at least one identification value (e.g., a value indicative of PIM format version, and optionally also length, period, count, and substream association values); and after the header, PIM in the following format:

active channel metadata of each silent channel and each non-silent channel of an audio program (i.e., which channel(s) of the program contain audio information, and which (if any) contain only silence (typically for the duration of the frame)). In embodiments in which the encoded bitstream is an AC-3 or E-AC-3 bitstream, the active channel metadata in a frame of the bitstream may be used in conjunction with additional metadata of the bitstream (e.g., the audio coding mode ("acmod") field of the frame, and, if present, the chanmap field in the frame or associated dependent substream frame(s)) to determine which channel(s) of the program contain audio information and which contain silence;

downmix processing state metadata indicative of whether the program was downmixed (prior to or during encoding), and if so, the type of downmixing that was applied. Downmix processing state metadata may be useful for implementing upmixing (e.g., in post-processor 300) downstream of a decoder, for example to upmix the audio content of the program using parameters that most closely match a type of downmixing that was applied. In embodiments in which the encoded bitstream is an AC-3 or E-AC-3 bitstream, the downmix processing state metadata may be used in conjunction with the audio coding mode ("acmod") field of the frame to determine the type of downmixing (if any) applied to the channel(s) of the program;

upmix processing state metadata indicative of whether the program was upmixed (e.g., from a smaller number of channels) prior to or during encoding, and if so, the type of upmixing that was applied. Upmix processing state metadata may be useful for implementing downmixing (in a post-processor) downstream of a decoder, for example to downmix the audio content of the program in a manner that is compatible with a type of upmixing (e.g., Dolby Pro Logic, or Dolby Pro Logic II Movie Mode, or Dolby Pro Logic II Music Mode, or Dolby Professional Upmixer) that was applied to the program. In embodiments in which the encoded bitstream is an E-AC-3 bitstream, the upmix processing state metadata may be used in conjunction with other metadata (e.g., the value of a "strmtyp" field of the frame) to determine the type of upmixing (if any) applied to the channel(s) of the program. The value of the "strmtyp" field (in the BSI segment of a frame of an E-AC-3 bitstream) indicates whether audio content of the frame belongs to an independent stream (which determines a program) or an independent substream (of a program which includes or is associated with multiple substreams) and thus may be decoded independently of any other substream indicated by the E-AC-3 bitstream, or whether audio content of the frame belongs to a dependent substream (of a program which includes or is associated with multiple substreams) and thus must be decoded in conjunction with an independent substream with which it is associated; and preprocessing state metadata indicative of whether preprocessing was performed on audio content of the frame (before encoding of the audio content to generated the encoded bitstream), and if so the type of preprocessing that was performed.

In some implementations, the preprocessing state metadata is indicative of:

whether surround attenuation was applied (e.g., whether surround channels of the audio program were attenuated by 3 dB prior to encoding), whether 90 degree phase shift applied (e.g., to surround channels Ls and Rs channels of the audio program prior to encoding), whether a low-pass filter was applied to an LFE channel of the audio program prior to encoding, whether level of an LFE channel of the program was monitored during production and if so the monitored level of the LFE channel relative to level of the full range audio channels of the program, whether dynamic range compression should be performed (e.g., in the decoder) on each block of decoded audio content of the program and if so the type (and/or parameters) of dynamic range compression to be performed (e.g., this type of preprocessing state metadata may be indicative of which of the following compression profile types was assumed by the encoder to generate dynamic range compression control values that are included in the encoded bitstream: Film Standard, Film Light, Music Standard, Music Light, or Speech. Alternatively, this type of preprocessing state metadata may indicate that heavy dynamic range compression ("compr" compression) should be performed on each frame of decoded audio content of the program in a manner determined by dynamic range compression control values that are included in the encoded bitstream), whether spectral extension processing and/or channel coupling encoding was employed to encode specific frequency ranges of content of the program and if so the minimum and maximum frequencies of the frequency components of the content on which spectral extension encoding was performed, and the minimum and maximum frequencies of frequency components of the content on which channel coupling encoding was performed. This type of preprocessing state metadata information may be useful to perform equalization (in a post-processor) downstream of a decoder. Both channel coupling and spectral extension information are also useful for optimizing quality during transcode operations and applications. For example, an encoder may optimize its behavior (including the adaptation of pre-processing steps such as headphone virtualization, up mixing, etc.) based on the state of parameters, such as spectral extension and channel coupling information. Moreover, the encoder may would adapt its coupling and spectral extension parameters dynamically to match and/or to optimal values based on the state of the inbound (and authenticated) metadata, and whether dialog enhancement adjustment range data is included in the encoded bitstream, and if so the range of adjustment available during performance of dialog enhancement processing (e.g., in a post-processor downstream of a decoder) to adjust the level of dialog content relative to the level of non-dialog content in the audio program.

In some embodiments, an LPSM payload included in a frame of an encoded bitstream (e.g., an E-AC-3 bitstream indicative of at least one audio program) buffered in buffer 201 includes LPSM in the following format:

a header (typically including a syncword identifying the start of the LPSM payload, followed by at least one identification value, e.g., the LPSM format version, length, period, count, and substream association values indicated in Table 2 below); and after the header, at least one dialog indication value (e.g., parameter "Dialog channel(s)" of Table 2) indicating whether corresponding audio data indicates dialog or does not indicate dialog (e.g., which channels of corresponding audio data indicate dialog);

at least one loudness regulation compliance value (e.g., parameter "Loudness Regulation Type" of Table 2) indicating whether corresponding audio data complies with an indicated set of loudness regulations;

at least one loudness processing value (e.g., one or more of parameters "Dialog gated Loudness Correction flag, " "Loudness Correction Type," of Table 2) indicating at least one type of loudness processing which has been performed on the corresponding audio data; and at least one loudness value (e.g., one or more of parameters "ITU Relative Gated Loudness," "ITU Speech Gated Loudness," "ITU (EBU 3341) Short-term 3s Loudness," and "True Peak" of Table 2) indicating at least one loudness (e.g., peak or average loudness) characteristic of the corresponding audio data.

In some implementations, parser 205 (and/or decoder stage 202) is configured to extract, from a waste bit segment, or an "addbsi" field, or an auxdata field, of a frame of the bitstream, each metadata segment having the following format:

a metadata segment header (typically including a syncword identifying the start of the metadata segment, followed by at least one identification value, e.g., version, length, and period, expanded element count, and substream association values); and after the metadata segment header, at least one protection value (e.g., the HMAC digest and Audio Fingerprint values of Table 1) useful for at least one of decryption, authentication, or validation of at least one of metadata of the metadata segment or the corresponding audio data); and also after the metadata segment header, metadata payload identification ("ID") and payload configuration values which identify the type and at least one aspect of the configuration (e.g., size) of each following metadata payload.

Each metadata payload segment (preferably having the above-specified format) follows the corresponding metadata payload ID and payload configuration values.

More generally, the encoded audio bitstream generated by preferred embodiments of the invention has a structure which provides a mechanism to label metadata elements and sub-elements as core (mandatory) or expanded (optional) elements or sub-elements. This allows the data rate of the bitstream (including its metadata) to scale across numerous applications. The core (mandatory) elements of the preferred bitstream syntax should also be capable of signaling that expanded (optional) elements associated with the audio content are present (in-band) and/or in a remote location (out of band).

Core element(s) are required to be present in every frame of the bitstream. Some sub-elements of core elements are optional and may be present in any combination. Expanded elements are not required to be present in every frame (to limit bitrate overhead). Thus, expanded elements may be present in some frames and not others. Some sub-elements of an expanded element are optional and may be present in any combination, whereas some sub-elements of an expanded element may be mandatory (i.e., if the expanded element is present in a frame of the bitstream).

In a class of embodiments, an encoded audio bitstream comprising a sequence of audio data segments and metadata segments is generated (e.g., by an audio processing unit which embodies the invention). The audio data segments are indicative of audio data, each of at least some of the metadata segments includes PIM and/or SSM (and optionally also metadata of at least one other type), and the audio data segments are time-division multiplexed with the metadata segments. In preferred embodiments in this class, each of the metadata segments has a preferred format to be described herein.

In one preferred format, the encoded bitstream is an AC-3 bitstream or an E-AC-3 bitstream, and each of the metadata segments which includes SSM and/or PIM is included (e.g., by stage 107 of a preferred implementation of encoder 100) as additional bit stream information in the "addbsi" field (shown in FIG. 6) of the Bitstream Information ("BSP") segment of a frame of the bitstream, or in an auxdata field of a frame of the bitstream, or in a waste bit segment of a frame of the bitstream.

In the preferred format, each of the frames includes a metadata segment (sometimes referred to herein as a metadata container, or container) in a waste bit segment (or addbsi field) of the frame. The metadata segment has the mandatory elements (collectively referred to as the "core element") shown in Table 1 below (and may include the optional elements shown in Table 1). At least some of the required elements shown in Table 1 are included in the metadata segment header of the metadata segment but some may be included elsewhere in the metadata segment:

TABLE 1

| Parameter | Description | Mandatory/ Optional |
|---|---|---|
| SYNC [ID] | | M |
| Core element version | | M |
| Core element length | | M |
| Core element period (xxx) | | M |
| Expanded element count | Indicates the number of expanded metadata elements associated with the core element. This value may increment/decrement as the bitstream is passed from production through distribution and final emission. | M |
| Substream association | Describes which substream(s) the core element is associated with. | M |
| Signature (HMAC digest) | 256-bit HMAC digest (using SHA-2 algorithm) computed over the audio data, the core element, and all expanded elements, of the entire frame. | M |
| PGM boundary countdown | Field only appears for some number of frames at the head or tail of an audio program file/stream. Thus, a core element version change could be used to signal the inclusion of this parameter. | O |
| Audio Fingerprint | Audio Fingerprint taken over some number of PCM audio samples represented by the core element period field. | O |
| Video Fingerprint | Video Fingerprint taken over some number of compressed video samples (if any) represented by the core element period field. | O |
| URL/UUID | This field is defined to carry a URL and/or a UUID (it may be redundant to the fingerprint) that references an external location of additional program content (essence) and/or metadata associated with the bitstream. | O |

In the preferred format, each metadata segment (in a waste bit segment or addbsi or auxdata field of a frame of an encoded bitstream) which contains SSM, PIM, or LPSM contains a metadata segment header (and optionally also additional core elements), and after the metadata segment header (or the metadata segment header and other core elements), one or more metadata payloads. Each metadata payload includes a metadata payload header (indicating a specific type of metadata (e.g., SSM, PIM, or LPSM) included in the payload, followed by metadata of the specific type. Typically, the metadata payload header includes the following values (parameters):

a payload ID (identifying the type of metadata, e.g., SSM, PIM, or LPSM) following the metadata segment header (which may include values specified in Table 1);

a payload configuration value (typically indicating the size of the payload) following the payload ID;

and optionally also, additional payload configuration values (e.g., an offset value indicating number of audio samples from the start of the frame to the first audio sample to which the payload pertains, and payload priority value, e.g., indicating a condition in which the payload may be discarded).

Typically, the metadata of the payload has one of the following formats:

the metadata of the payload is SSM, including independent substream metadata indicative of the number of independent substreams of the program indicated by the bitstream; and dependent substream metadata indicative of whether each independent substream of the program has at least one dependent substream associated with it, and if so the number of dependent substreams associated with each independent substream of the program;

the metadata of the payload is PIM, including active channel metadata indicative of which channel(s) of an audio program contain audio information, and which (if any) contain only silence (typically for the duration of the frame); downmix processing state metadata indicative of whether the program was downmixed (prior to or during encoding), and if so, the type of downmixing that was applied, upmix processing state metadata indicative of whether the program was upmixed (e.g., from a smaller number of channels) prior to or during encoding, and if so, the type of upmixing that was applied, and preprocessing state metadata indicative of whether preprocessing was performed on audio content of the frame (before encoding of the audio content to generated the encoded bitstream), and if so the type of preprocessing that was performed; or the metadata of the payload is LPSM having format as indicated in the following table (Table 2):

TABLE 2

| LPSM Parameter [Intelligent Loudness] | Description | number of unique states | Mandatory/Optional | Insertion Rate (Period of updating of the parameter) |
|---|---|---|---|---|
| LPSM version | | | M | |
| LPSM period (xxx) | Applicable to xxx fields only | | M | |
| LPSM count | | | M | |
| LPSM substream association | | | M | |

TABLE 2-continued

| LPSM Parameter [Intelligent Loudness] | Description | number of unique states | Mandatory/Optional | Insertion Rate (Period of updating of the parameter) |
|---|---|---|---|---|
| Dialog channel(s) | Indicates which combination of L, C & R audio channels contain speech over the previous 0.5 seconds. When, speech is not present in any L, C or R combination, then this parameter shall indicate "no dialog" | 8 | M | ~0.5 seconds (typical) |
| Loudness Regulation Type | Indicates that the associated audio data stream is in compli-ance with a specific set of regula-tions (e.g., ATSC A/85 orEBU R128) | 8 | M | Frame |
| Dialog gated Loudness Correction flag | Indicates if the associated audio stream has been corrected based on dialog gating | 2 | O (only present if Loudness_Regulation_Type indicates that the corresponding audio is UNCORRECTED) | Frame |
| Loudness Correction Type | Indicates if the associated audio stream has been corrected with an infinite look-ahead (file-based) or with a realtime (RT) loudness and dynamic range controller. | 2 | O (only present if Loudness_Regulation_Type indicates that the corresponding audio is UNCORRECTED) | Frame |
| ITU Relative Gated Loudness (INF) | Indicates the ITU-R BS.1770-3 integrated loudness of the associated audio stream w/o | 128 | O | 1 sec |

TABLE 2-continued

| LPSM Parameter [Intelligent Loudness] | Description | number of unique states | Mandatory/Optional | Insertion Rate (Period of updating of the parameter) |
|---|---|---|---|---|
| | metadata applied (e.g., 7 bits: −58 –> +5.5 LKFS 0.5 LKFS steps) | | | |
| ITU Speech Gated Loudness (INF) | Indicates the ITU-R BS.1770-1/3 integrated loudness of the speech/dialog of the associated audio stream w/o metadata applied (e.g., 7 bits: −58 –> +5.5 LKFS 0.5 LKFS steps) | 128 | O | 1 sec |
| ITU (EBU 3341) Short-term 3 s Loudness | Indicates the 3-second ungated ITU (ITU-BS.1771-1) loudness of the associated audio stream w/o metadata applied (sliding window) @ ~10 Hz insertion rate (e.g., 8 bits: 116 –> +11.5 LKFS 0.5 LKFS steps) | 256 | O | 0.1 sec |
| True Peak value | Indicates the ITU-R BS.1770-3 Annex 2 TruePeak value (dB TP) of the associated audio stream w/o metadata applied. (i.e., largest value over frame period signaled in element period field) 116 –> +11.5 LKFS 0.5 LKFS steps | 256 | O | 0.5 sec |

TABLE 2-continued

| LPSM Parameter [Intelligent Loudness] | Description | number of unique states | Mandatory/Optional | Insertion Rate (Period of updating of the parameter) |
|---|---|---|---|---|
| Downmix Offset | Indicates downmix loudness offset | | | |
| Program Boundary | Indicates, in frames, when a program boundary will or has occurred. When program boundary is not at frame boundary, optional sample offset will indicate how far in frame actual program boundary occurs | | | |

In another preferred format of an encoded bitstream generated in accordance with the invention, the bitstream is an AC-3 bitstream or an E-AC-3 bitstream, and each of the metadata segments which includes PIM and/or SSM (and optionally also metadata of at least one other type) is included (e.g., by stage 107 of a preferred implementation of encoder 100) in any of: a waste bit segment of a frame of the bitstream; or an "addbsi" field (shown in FIG. 6) of the Bitstream Information ("BSI") segment of a frame of the bitstream; or an auxdata field (e.g., the AUX segment shown in FIG. 4) at the end of a frame of the bitstream. A frame may include one or two metadata segments, each of which includes PIM and/or SSM, and (in some embodiments) if the frame includes two metadata segments, one may be present in the addbsi field of the frame and the other in the AUX field of the frame. Each metadata segment preferably has the format specified above with reference to Table 1 above (i.e., it includes the core elements specified in Table 1, followed by payload ID (identifying type of metadata in each payload of the metadata segment) and payload configuration values, and each metadata payload). Each metadata segment including LPSM preferably has the format specified above with reference to Tables 1 and 2 above (i.e., it includes the core elements specified in Table 1, followed by payload ID (identifying the metadata as LPSM) and payload configuration values, followed by the payload (LPSM data which has format as indicated in Table 2)).

In another preferred format, the encoded bitstream is a Dolby E bitstream, and each of the metadata segments which includes PIM and/or SSM (and optionally also other metadata) is the first N sample locations of the Dolby E guard band interval. A Dolby E bitstream including such a metadata segment which includes LPSM preferably includes a value indicative of LPSM payload length signaled in the Pd word of the SMPTE 337M preamble (the SMPTE 337M Pa word repetition rate preferably remains identical to associated video frame rate).

In a preferred format, in which the encoded bitstream is an E-AC-3 bitstream, each of the metadata segments which includes PIM and/or SSM (and optionally also LPSM and/or other metadata) is included (e.g., by stage 107 of a preferred implementation of encoder 100) as additional bitstream information in a waste bit segment, or in the "addbsi" field of the Bitstream Information ("BSI") segment, of a frame of the bitstream. We next describe additional aspects of encoding an E-AC-3 bitstream with LPSM in this preferred format:

1. during generation of an E-AC-3 bitstream, while the E-AC-3 encoder (which inserts the LPSM values into the bitstream) is "active," for every frame (syncframe) generated, the bitstream should include a metadata block (including LPSM) carried in the addbsi field (or waste bit segment) of the frame. The bits required to carry the metadata block should not increase the encoder bitrate (frame length);
2. Every metadata block (containing LPSM) should contain the following information:
   - loudness_correction_type_flag: where '1' indicates the loudness of the corresponding audio data was corrected upstream from the encoder, and '0' indicates the loudness was corrected by a loudness corrector embedded in the encoder (e.g., loudness processor 103 of encoder 100 of FIG. 2);
   - speech_channel: indicates which source channel(s) contain speech (over the previous 0.5 sec). If no speech is detected, this shall be indicated as such;
   - speech_loudness: indicates the integrated speech loudness of each corresponding audio channel which contains speech (over the previous 0.5 sec);
   - ITU_loudness: indicates the integrated ITU BS.1770-3 loudness of each corresponding audio channel; and
   - gain: loudness composite gain(s) for reversal in a decoder (to demonstrate reversibility);
3. While the E-AC-3 encoder (which inserts the LPSM values into the bitstream) is "active" and is receiving an AC-3 frame with a 'trust' flag, the loudness controller in the encoder (e.g., loudness processor 103 of encoder 100 of FIG. 2) should be bypassed. The 'trusted' source dialnorm and DRC values should be passed through (e.g., by generator 106 of encoder 100) to the E-AC-3 encoder component (e.g., stage 107 of encoder 100). The LPSM block generation continues and the loudness_correction_type_flag is set to '1'. The loudness controller bypass sequence must be synchronized to the start of the decoded AC-3 frame where the 'trust' flag appears. The loudness controller bypass sequence should be implemented as follows: the leveler_amount control is decremented from a value of 9 to a value of 0 over 10 audio block periods (i.e. 53.3 msec) and the leveler_back_end_meter control is placed into bypass mode (this operation should result in a seamless transition). The term "trusted" bypass of the leveler implies that the source bitstream's dialnorm value is also re-utilized at the output of the encoder. (e.g. if the 'trusted' source bitstream has a dialnorm value of −30 then the output of the encoder should utilize −30 for the outbound dialnorm value);

4. While the E-AC-3 encoder (which inserts the LPSM values into the bitstream) is "active" and is receiving an AC-3 frame without the 'trust' flag, the loudness controller embedded in the encoder (e.g., loudness processor 103 of encoder 100 of FIG. 2) should be active. LPSM block generation continues and the loudness_correction_type_flag is set to '0'. The loudness controller activation sequence should be synchronized to the start of the decoded AC-3 frame where the 'trust' flag disappears. The loudness controller activation sequence should be implemented as follows: the leveler_amount control is incremented from a value of 0 to a value of 9 over 1 audio block period. (i.e. 5.3 msec) and the leveler_back_end_meter control is placed into 'active' mode (this operation should result in a seamless transition and include a back_end_meter integration reset); and
5. during encoding, a graphic user interface (GUI) should indicate to a user the following parameters: "Input Audio Program: [Trusted/Untrusted]"—the state of this parameter is based on the presence of the "trust" flag within the input signal; and "Real-time Loudness Correction: [Enabled/Disabled]"—the state of this parameter is based on the whether this loudness controller embedded in the encoder is active.

When decoding an AC-3 or E-AC-3 bitstream which has LPSM (in the preferred format) included in a waste bit or skip field segment, or the "addbsi" field of the Bitstream Information ("BSI") segment, of each frame of the bitstream, the decoder should parse the LPSM block data (in the waste bit segment or addbsi field) and pass all of the extracted LPSM values to a graphic user interface (GUI). The set of extracted LPSM values is refreshed every frame.

In another preferred format of an encoded bitstream generated in accordance with the invention, the encoded bitstream is an AC-3 bitstream or an E-AC-3 bitstream, and each of the metadata segments which includes PIM and/or SSM (and optionally also LPSM and/or other metadata) is included (e.g., by stage 107 of a preferred implementation of encoder 100) in a waste bit segment, or in an Aux segment, or as additional bit stream information in the "addbsi" field (shown in FIG. 6) of the Bitstream Information ("BSI") segment, of a frame of the bitstream. In this format (which is a variation on the format described above with references to Tables 1 and 2), each of the addbsi (or Aux or waste bit) fields which contains LPSM contains the following LPSM values:

the core elements specified in Table 1, followed by payload ID (identifying the metadata as LPSM) and payload configuration values, followed by the payload (LPSM data) which has the following format (similar to the mandatory elements indicated in Table 2 above):

version of LPSM payload: a 2-bit field which indicates the version of the LPSM payload;

dialchan: a 3-bit field which indicates whether the Left, Right and/or Center channels of corresponding audio data contain spoken dialog. The bit allocation of the dialchan field may be as follows: bit 0, which indicates the presence of dialog in the left channel, is stored in the most significant bit of the dialchan field; and bit 2, which indicates the presence of dialog in the center channel, is stored in the least significant bit of the dialchan field.

Each bit of the dialchan field is set to '1' if the corresponding channel contains spoken dialog during the preceding 0.5 seconds of the program;

loudregtyp: a 4-bit field which indicates which loudness regulation standard the program loudness complies with. Setting the "loudregtyp" field to '000' indicates that the LPSM does not indicate loudness regulation compliance. For example, one value of this field (e.g., 0000) may indicate that compliance with a loudness regulation standard is not indicated, another value of this field (e.g., 0001) may indicate that the audio data of the program complies with the ATSC A/85 standard, and another value of this field (e.g., 0010) may indicate that the audio data of the program complies with the EBU R128 standard. In the example, if the field is set to any value other than '0000', the loudcorrdialgat and loudcorrtyp fields should follow in the payload;

loudcorrdialgat: a one-bit field which indicates if dialog-gated loudness correction has been applied. If the loudness of the program has been corrected using dialog gating, the value of the loudcorrdialgat field is set to '1'. Otherwise it is set to '0';

loudcorrtyp: a one-bit field which indicates type of loudness correction applied to the program. If the loudness of the program has been corrected with an infinite look-ahead (file-based) loudness correction process, the value of the loudcorrtyp field is set to '0'. If the loudness of the program has been corrected using a combination of realtime loudness measurement and dynamic range control, the value of this field is set to '1';

loudrelgate: a one-bit field which indicates whether relative gated loudness data (ITU) exists. If the loudrelgate field is set to '1', a 7-bit ituloudrelgat field should follow in the payload;

loudrelgat: a 7-bit field which indicates relative gated program loudness (ITU). This field indicates the integrated loudness of the audio program, measured according to ITU-R BS.1770-3 without any gain adjustments due to dialnorm and dynamic range compression (DRC) being applied. The values of 0 to 127 are interpreted as −58 LKFS to +5.5 LKFS, in 0.5 LKFS steps;

loudspchgate: a one-bit field which indicates whether speech-gated loudness data (ITU) exists. If the loudspchgate field is set to '1', a 7-bit loudspchgat field should follow in the payload;

loudspchgat: a 7-bit field which indicates speech-gated program loudness. This field indicates the integrated loudness of the entire corresponding audio program, measured according to formula (2) of ITU-R BS.1770-3 and without any gain adjustments due to dialnorm and dynamic range compression being applied. The values of 0 to 127 are interpreted as −58 to +5.5 LKFS, in 0.5 LKFS steps;

loudstrm3se: a one-bit field which indicates whether short-term (3 second) loudness data exists. If the field is set to '1', a 7-bit loudstrm3s field should follow in the payload;

loudstrm3s: a 7-bit field which indicates the ungated loudness of the preceding 3 seconds of the corresponding audio program, measured according to ITU-R BS.1771-1 and without any gain adjustments due to dialnorm and dynamic range compression being applied. The values of 0 to 256 are interpreted as −116 LKFS to +11.5 LKFS in 0.5 LKFS steps;

truepke: a one-bit field which indicates whether true peak loudness data exists. If the truepke field is set to '1', an 8-bit truepk field should follow in the payload; and truepk: an 8-bit field which indicates the true peak sample value of the program, measured according to Annex 2 of ITU-R BS.1770-3 and without any gain adjustments due to dialnorm and dynamic range compression being applied. The values of 0 to 256 are interpreted as −116 LKFS to +11.5 LKFS in 0.5 LKFS steps.

In some embodiments, the core element of a metadata segment in a waste bit segment or in an auxdata (or "addbsi") field of a frame of an AC-3 bitstream or an E-AC-3 bitstream comprises a metadata segment header (typically including identification values, e.g., version), and after the metadata segment header: values indicative of whether fingerprint data is (or other protection values are) included for metadata of the metadata segment, values indicative of whether external data (related to audio data corresponding to the metadata of the metadata segment) exists, payload ID and payload configuration values for each type of metadata (e.g., PIM and/or SSM and/or LPSM and/or metadata of a type) identified by the core element, and protection values for at least one type of metadata identified by the metadata segment header (or other core elements of the metadata segment). The metadata payload(s) of the metadata segment follow the metadata segment header, and are (in some cases) nested within core elements of the metadata segment.

Embodiments of the present invention may be implemented in hardware, firmware, or software, or a combination of both (e.g., as a programmable logic array). Unless otherwise specified, the algorithms or processes included as part of the invention are not inherently related to any particular computer or other apparatus. In particular, various general-purpose machines may be used with programs written in accordance with the teachings herein, or it may be more convenient to construct more specialized apparatus (e.g., integrated circuits) to perform the required method steps. Thus, the invention may be implemented in one or more computer programs executing on one or more programmable computer systems (e.g., an implementation of any of the elements of FIG. 1, or encoder 100 of FIG. 2 (or an element thereof), or decoder 200 of FIG. 3 (or an element thereof), or post-processor 300 of FIG. 3 (or an element thereof)) each comprising at least one processor, at least one data storage system (including volatile and non-volatile memory and/or storage elements), at least one input device or port, and at least one output device or port. Program code is applied to input data to perform the functions described herein and generate output information. The output information is applied to one or more output devices, in known fashion.

Each such program may be implemented in any desired computer language (including machine, assembly, or high level procedural, logical, or object oriented programming languages) to communicate with a computer system. In any case, the language may be a compiled or interpreted language.

For example, when implemented by computer software instruction sequences, various functions and steps of embodiments of the invention may be implemented by multithreaded software instruction sequences running in suitable digital signal processing hardware, in which case the various devices, steps, and functions of the embodiments may correspond to portions of the software instructions.

Each such computer program is preferably stored on or downloaded to a storage media or device (e.g., solid state memory or media, or magnetic or optical media) readable by a general or special purpose programmable computer, for configuring and operating the computer when the storage media or device is read by the computer system to perform the procedures described herein. The inventive system may also be implemented as a computer-readable storage medium, configured with (i.e., storing) a computer program, where the storage medium so configured causes a computer system to operate in a specific and predefined manner to perform the functions described herein.

A number of embodiments of the invention have been described. Nevertheless, it will be understood that various modifications may be made without departing from the spirit and scope of the invention. Numerous modifications and variations of the present invention are possible in light of the above teachings. It is to be understood that within the scope of the appended claims, the invention may be practiced otherwise than as specifically described herein.

What is claimed is:

1. An audio processing unit, comprising:

one or more processors;

memory coupled to the one or more processors and configured to store instructions, which, when executed by the one or more processors, cause the one or more processors to perform operations comprising:

receiving an encoded audio bitstream comprising an audio program, the encoded audio bitstream including encoded audio data of a set of one or more audio channels and metadata associated with the set of audio channels, wherein the metadata includes dynamic range control (DRC) metadata, loudness metadata, and metadata indicating a number of channels in the set of audio channels, wherein the DRC metadata includes DRC values and DRC profile metadata indicative of a DRC profile used to generate the DRC values, and wherein the loudness metadata includes metadata indicative of a dialog loudness of the audio program;

decoding the encoded audio data to obtain decoded audio data of the set of audio channels;

obtaining the DRC values and the metadata indicative of the dialog loudness of the audio program from the metadata of the encoded audio bitstream;

receiving pre-processing metadata; and modifying the decoded audio data of the set of audio channels in response to the DRC values, the pre-processing metadata, and the metadata indicative of the dialog loudness of the audio program, wherein modifying the decoded audio data comprises performing loudness control of the decoded audio data in response to the pre-processing metadata and the dialog loudness of the audio program.

2. The audio processing unit of claim 1, wherein the encoded audio bitstream includes a metadata container, and the metadata container includes a header and one or more metadata payloads after the header, the one or more metadata payloads including the DRC metadata.

3. A method performed by an audio processing unit, comprising:

receiving an encoded audio bitstream comprising an audio program, the encoded audio bitstream including encoded audio data of a set of one or more audio channels and metadata associated with the set of audio channels, wherein the metadata includes dynamic range control (DRC) metadata, loudness metadata, and metadata indicating a number of channels in the set of audio channels, wherein the DRC metadata includes DRC values and DRC profile metadata indicative of a DRC profile used to generate the DRC values, and wherein the loudness metadata includes metadata indicative of a dialog loudness of the audio program;

decoding the encoded audio data to obtain decoded audio data of the set of audio channels;

obtaining the DRC values and the metadata indicative of the dialog loudness of the audio program from the metadata of the encoded audio bitstream;

receiving pre-processing metadata; and modifying the decoded audio data of the set of audio channels in response to the DRC values, the pre-processing metadata, and the metadata indicative of the dialog loudness of the audio program, wherein modifying the decoded audio data comprises performing loudness control of the decoded audio data in response to the pre-processing metadata and the dialog loudness of the audio program.

4. A non-transitory, computer-readable storage medium having stored thereon instructions, which, when executed by one or more processors, cause the one or more processors to perform operations comprising:

receiving an encoded audio bitstream comprising an audio program, the encoded audio bitstream including encoded audio data of a set of one or more audio channels and metadata associated with the set of audio channels, wherein the metadata includes dynamic range control (DRC) metadata, loudness metadata, and metadata indicating a number of channels in the set of audio channels, wherein the DRC metadata includes DRC values and DRC profile metadata indicative of a DRC profile used to generate the DRC values, and wherein the loudness metadata includes metadata indicative of a dialog loudness of the audio program;

decoding the encoded audio data to obtain decoded audio data of the set of audio channels;

obtaining the DRC values and the metadata indicative of the dialog loudness of the audio program from the metadata of the encoded audio bitstream;

receiving pre-processing metadata; and modifying the decoded audio data of the set of audio channels in response to the DRC values, the pre-processing metadata, and the metadata indicative of the dialog loudness of the audio program, wherein modifying the decoded audio data comprises performing loudness control of the decoded audio data in response to the pre-processing metadata and the dialog loudness of the audio program.

* * * * *